(12) United States Patent
Mikami et al.

(10) Patent No.: US 7,910,525 B2
(45) Date of Patent: *Mar. 22, 2011

(54) GREASE COMPOSITION, GREASE-ENCLOSED BEARING, AND ROTATION-TRANSMITTING APPARATUS WITH BUILT-IN ONE WAY CLUTCH

(75) Inventors: Hidenobu Mikami, Kuwana (JP); Takayuki Kawamura, Kuwana (JP)

(73) Assignee: NTN Corporation, Osaka (JP)

( * ) Notice: Subject to any disclaimer, the term of this patent is extended or adjusted under 35 U.S.C. 154(b) by 167 days.
This patent is subject to a terminal disclaimer.

(21) Appl. No.: 11/918,566

(22) PCT Filed: Apr. 20, 2006

(86) PCT No.: PCT/JP2006/308314
§ 371 (c)(1), (2), (4) Date: Dec. 3, 2007

(87) PCT Pub. No.: WO2006/112502
PCT Pub. Date: Oct. 26, 2006

(65) Prior Publication Data
US 2008/0196995 A1   Aug. 21, 2008

(30) Foreign Application Priority Data

| | | |
|---|---|---|
| Apr. 20, 2005 | (JP) | P2005-122634 |
| Jul. 13, 2005 | (JP) | P2005-204769 |
| Jul. 13, 2005 | (JP) | P2005-204804 |
| Jul. 28, 2005 | (JP) | P2005-218906 |
| Aug. 4, 2005 | (JP) | P2005-226220 |
| Aug. 4, 2005 | (JP) | P2005-226221 |
| Aug. 12, 2005 | (JP) | P2005-234118 |
| Aug. 12, 2005 | (JP) | P2005-234119 |
| Aug. 22, 2005 | (JP) | P2005-240104 |
| Aug. 22, 2005 | (JP) | P2005-240105 |
| Sep. 1, 2005 | (JP) | P2005-253905 |
| Sep. 1, 2005 | (JP) | P2005-253906 |
| Sep. 2, 2005 | (JP) | P2005-254653 |
| Sep. 2, 2005 | (JP) | P2005-254738 |

(51) Int. Cl.
*C10M 125/04* (2006.01)
*C10M 169/04* (2006.01)
*F16D 11/06* (2006.01)
*F16C 33/02* (2006.01)

(52) U.S. Cl. ........ 508/165; 508/154; 192/41 R; 384/607

(58) Field of Classification Search .................. 508/165, 508/154; 192/41 R; 384/607
See application file for complete search history.

(56) References Cited

U.S. PATENT DOCUMENTS
3,928,214 A * 12/1975 Naka et al. .................... 508/123
(Continued)

FOREIGN PATENT DOCUMENTS
EP   0675192   4/1995
(Continued)

OTHER PUBLICATIONS
"Trenie i Iznos," 1984, pp. 882-888, vol. 5, No. 5.
(Continued)

*Primary Examiner* — Glenn A Caldarola
*Assistant Examiner* — Vishal Vasisth
(74) *Attorney, Agent, or Firm* — Hedman & Costigan, P.C.; James V. Costigan

(57) ABSTRACT

The present invention provides a grease composition capable of effectively preventing a rolling surface of a bearing from having hydrogen brittleness-caused peeling, a grease-enclosed bearing in which the grease composition is enclosed, and a rotation-transmitting apparatus with a built-in one-way clutch in which the grease composition is enclosed at a sliding portion. The grease composition contains a base grease consisting of a base oil and a thickener; and an additive added to the base grease. The grease composition prevents a frictional wear surface of the sliding portion or a newly generated surface consisting of iron or the like exposed owing to wear from being peeled owing to hydrogen brittleness. The additive contains a bismuth-based additive or a magnesium-based additive. The bismuth-based additive consists of at least one of inorganic bismuth and organic bismuth not containing a sulfur component. The magnesium-based additive consists of at least one of inorganic magnesium and organic magnesium. The grease-enclosed bearing encloses the above-described grease composition.

13 Claims, 12 Drawing Sheets

U.S. PATENT DOCUMENTS

| | | | |
|---|---|---|---|
| 4,915,856 A * | 4/1990 | Jamison | 508/103 |
| 5,536,424 A * | 7/1996 | Delfort et al. | 508/401 |
| 5,773,394 A | 6/1998 | Wan et al. | |
| 6,015,775 A * | 1/2000 | Takayama et al. | 508/103 |
| 6,022,835 A * | 2/2000 | Fletcher | 508/365 |
| 6,090,755 A | 7/2000 | Wan et al. | |
| 6,429,175 B1 * | 8/2002 | Stuart et al. | 508/144 |
| 6,613,721 B1 * | 9/2003 | Kernizan et al. | 508/103 |
| 2004/0033911 A1 | 2/2004 | Mikami et al. | |
| 2004/0092408 A1 * | 5/2004 | Willey et al. | 508/165 |
| 2005/0020456 A1 * | 1/2005 | Kawamura et al. | 508/364 |
| 2005/0261141 A1 * | 11/2005 | Iso et al. | 508/154 |

FOREIGN PATENT DOCUMENTS

| | | |
|---|---|---|
| EP | 0795598 | 9/1997 |
| EP | 1338584 | 2/2004 |
| JP | S50-134006 | 10/1975 |
| JP | 60-149696 | 8/1985 |
| JP | 03-210394 | 9/1991 |
| JP | 08-041778 | 2/1996 |
| JP | 10-017887 | 2/1998 |
| JP | 10-030096 | 2/1998 |
| JP | 11-082688 | 3/1999 |
| JP | 2000-234638 | 8/2000 |
| JP | 2000-253620 | 9/2000 |
| JP | 2001-065578 | 3/2001 |
| JP | 2001-123191 | 5/2001 |
| JP | 2001-247888 | 9/2001 |
| JP | 2003-042166 | 2/2003 |
| JP | 2003-105366 | 4/2003 |
| JP | 2004-059814 | 2/2004 |
| JP | 2004-124035 | 4/2004 |
| JP | 2004-270887 | 9/2004 |
| JP | 2005-029622 | 2/2005 |
| JP | 2005-029623 | 2/2005 |
| JP | 2005-042102 | 2/2005 |
| JP | 2005-076021 | 3/2005 |
| JP | 2005-112901 | 4/2005 |
| JP | 2005-255977 | 9/2005 |
| JP | 2005-256891 | 9/2005 |
| JP | 2005-298604 | 10/2005 |
| JP | 2006-009922 | 1/2006 |
| JP | 2006-051508 | 2/2006 |
| JP | 2006-052751 | 2/2006 |
| JP | 2006-090492 | 4/2006 |
| SU | 827538 | 5/1981 |
| SU | 1253990 | 8/1986 |
| WO | WO 2005/075610 | 8/2005 |

OTHER PUBLICATIONS

"Trenie i Iznos," 1986, pp. 168-172, vol. 7, No. 1.
English Abstract of JP 2004-238630 Dated Aug. 26, 2004.

* cited by examiner

GREASE COMPOSITION, GREASE-ENCLOSED BEARING, AND ROTATION-TRANSMITTING APPARATUS WITH BUILT-IN ONE WAY CLUTCH

This application is a 371 of PCT/JP2006/308314, filed Apr. 20, 2006.

TECHNICAL FIELD

The present invention relates to a grease composition capable of effectively preventing a rolling surface from having hydrogen brittleness-caused peeling and a grease-enclosed bearing in which the grease composition is enclosed.

More particularly the present invention relates to a grease-enclosed bearing such as a rolling bearing for use in an electric auxiliary machine for a car such as a fan-coupling apparatus, an alternator, an idler pulley, an electromagnetic clutch for an air conditioner, an electromotive fan motor, and the like; a grease-enclosed bearing for motors for use in industrial machine and electric equipment; a rolling bearing for use in a compressed fluid-feeding machine or the like for delivering various kinds of fluids inside a fuel cell battery under pressure; a rolling bearing for use in a robot which is used in operating portions of industrial robots; and a rolling bearing for use in a wheel-supporting apparatus for rotatably supporting wheels on a suspension apparatus for a car.

The present invention also relates to a rotation-transmitting apparatus with a built-in one-way clutch in which the grease composition is enclosed at a sliding portion.

BACKGROUND ART

Owing to a recent growing demand for development of small vehicles, lightweight vehicles, and the improvement of silence, attempts are being made to manufacture a smaller and more lightweight electric auxiliary machine of vehicles, and to make the engine room airtight. On the other hand, there is a growing demand for a high output and a high efficiency for the performance of various apparatuses of the vehicle. Thus the present tendency is to compensate the miniaturization-caused reduction of the output of the electric auxiliary machine of the vehicle provided inside the engine room by rotating them at high speeds.

As examples of rolling bearings for use in the electric auxiliary of the vehicle, a rolling bearing for use in the fan coupling apparatus, a rolling bearing for use in the alternator, a rolling bearing for use in the idle pulley are outlined below.

Regarding the fan coupling apparatus, a viscous fluid is sealed inside it. A housing having an air-feeding fan mounted on its peripheral surface is coupled to a rotor directly connected to the engine through a bearing. By utilizing the shear resistance of the viscous fluid which increases and decreases in response to an atmospheric temperature, the fan-coupling apparatus controls the amount of a driving torque transmitted from the engine and the number of rotations of the fan, thereby feeding optimum air corresponding to the temperature of the engine. Therefore the rolling bearing for use in the fan-coupling apparatus is demanded to have a high heat resistance, grease-sealing performance, and durability so that the rolling bearing withstands a high rotational speed change in the range from 1000 rpm to 10000 rpm in dependence on a fluctuation of the temperature of the engine and in addition withstands very strict environment in which it is driven in summer at a high speed not less than 10000 rpm at a high temperature not less than 180° C.

The alternator for use in a car receives the rotation of an engine and generates electricity, thus supplying an electric power to an electric load of the car and has a function of charging a battery. Therefore the rolling bearing for use in the alternator is demanded to have a high heat resistance, grease-sealing performance, and durability so that the rolling bearing withstands a very strict environment in which it is rotated at a high speed not less than 10000 rpm at a high temperature not less than 180° C. As a method of improving the durability of the rolling bearing, there is proposed a material composed of the combination of urea-based grease and a terpolymer of vinylidene fluoride-tetrafluoroethylene-propylene or a bipolymer of tetrafluoroethylene-propylene for composing an elastic body of a sealing member demanded to have high heat resistance and durability (see patent document 1).

In the rolling bearing for use in a fan-coupling apparatus and an alternator proposed by the present applicant, grease containing an urea compound is used. The sealing member for sealing the grease is composed of the rubber molding of the vulcanizable fluororubber composition which contacts the grease. The rubber molding consists of the copolymer containing the monomer, for crosslinking use, containing tetrafluoroethylene, propylene, and unsaturated hydrocarbon, having 2 to 4 carbon atoms, in which a part of hydrogen atoms are substituted with fluorine atoms (see patent document 2).

The idle pulley is used as a belt tensioning part for the driving belt transmitting the engine power to the electric auxiliary machine of the vehicle. The idle pulley has the function of a pulley for imparting a tensile force to the driving belt when the distance between rotating shafts is fixed. The idle pulley has another function of an idler used to change the travel direction of the belt or preventing interference with obstacles to thereby reduce the volume of the engine chamber.

Therefore the rolling bearing for use in the idle pulley is demanded to have a high heat resistance, grease-sealing performance, and durability so that the rolling bearing withstands a very strict environment in which it is rotated at a high speed not less than 10000 rpm at a high temperature not less than 180° C. As a grease composition preferable for the rolling bearing which is used at high temperature and rotational speed, a grease composition is known (see patent document 3). The grease composition contains 0.5 to 10 wt % of amide-based wax having the property of preventing the base oil from being oxidized and having a melting point not less than 80° C. The base oil has a kinematic viscosity of 20 to 150 $mm^2$/second at 40° C. The grease composition contains the urea-based thickener at 5 to 30 wt % for the entire grease composition.

In recent years, there is a tendency for small motors to be manufactured in industrial machines and for a bearing to be operated at a high surface pressure. In a servo motor, an acceleration and a deceleration to be applied thereto become high in stop—drive. As a result, the bearing has a large amount of slide. At a high temperature, the operation of high-speed drive—sudden deceleration drive—sudden acceleration drive—sudden stop is frequently repeated.

In a manufacturing line of a car, various kinds of industrial robots are used for assembling, welding, painting operations. To decrease a tact time for the improvement of productivity, there is a tendency for the motion speed of the robot to be increased. The operation of the robot is not successive, but intermittent. An increase in the operation speed of the robot causes the rolling bearing for use in a rotational portion to have an increase in the number of switching times of stop—start—operation—stopping operation per time. Each time switching is performed, an acceleration and a deceleration to be applied to the rolling bearing become high. Thereby the rolling bearing generates a large amount of slide.

In recent years, because the use condition for the rolling bearing for use in an electric auxiliary machine for a car, the bearing for use in a motor of an industrial machine, and the bearing for use in a robot has become strict, as described above, a peculiar peeling phenomenon occurs with the rolling surface of the bearing turning into white in its texture.

Unlike peeling which occurs in the inside of the rolling surface owing to metal fatigue, the peculiar peeling phenomenon occurs in the rolling surface at a comparatively shallow portion thereof with the rolling surface turning into white in its texture. That is, the peeling phenomenon is considered to be a hydrogen brittleness-caused destruction phenomenon.

As a method of preventing the peculiar peeling phenomenon which occurs in an early stage with the rolling surface turning into white in its texture, a method of adding a passivating agent to a grease composition and a method of adding bismuth dithiocarbamate thereto are known (see patent documents 4 and 5).

In recent years, because the rolling bearing for use in the electric auxiliary machine for a car, the motor of an industrial machine, and the robot are used in a strict condition, the method of adding the passivating agent to the grease composition and the like are incapable of solving the problem of the peeling phenomenon.

A fuel cell system attracts public attention as a new power source for a car or as a dispersion type generating apparatus. A fuel cell has a high output density and is operated at a low temperature. Further a material constructing the cell deteriorates to a low extent. A solid high molecular electrolyte type fuel cell which is actuated easily is effective as a power source of the car or the like.

In the fuel cell system, it is necessary to feed hydrogen and hydrogen rich modified gas serving as fuel and air serving as an oxidizing agent under pressure. To this end, various types of compressed fluid-feeding machines such as a supercharger, an impeller-type compressed fluid-feeding machine, a scroll-type compressed fluid-feeding machine, an iron plate-type compressed fluid-feeding machine, and a screw-type compressed fluid-feeding machine are used.

In the solid high molecular electrolyte type fuel cell, for power generation, hydrogen serving as fuel and air serving as an oxidizing agent react with each other in a chemical reaction to generate water. In addition, a high molecular film is humidified by a humidifier to function the high molecular film as a solid electrolyte. Thus the solid high molecular electrolyte type fuel cell is constantly kept in a water-containing state. Therefore water is contained in a gas fed under pressure by the compressed fluid-feeding machine. When the water penetrates into the bearing of the compressed fluid-feeding machine, metal contact occurs due to defective lubrication. Therefore as in the case of the rolling bearing for use in the electric auxiliary machine of the car, there is a case in which the hydrogen brittleness-caused peeling phenomenon occurs with the rolling surface of the bearing turning into white in its texture.

Because the use condition for the rolling bearing for use in the fuel cell system has also become strict, the method of adding the passivating agent to the grease composition (see patent document 4) and the method of adding the bismuth dithiocarbamate thereto (see patent document 5) are incapable of solving the problem of the hydrogen brittleness-caused peeling phenomenon. In compliance with a demand for an increase in the generation amount of electricity, the compressed fluid-feeding machine is requested to have high performance and operated at a high speed. Accordingly the rolling bearing is rotated at high speed with a large load applied thereto, which causes the bearing portion to have a high temperature of about 180° C. Thus the rolling bearing is demanded to have excellent heat resistance.

The fan-coupling apparatus, the alternator, and the like which are electric auxiliary machines for a car are used to efficiently utilize the rotational torque of an engine through a one-way clutch which is connected to an engine output shaft only when the engine is in a predetermined output state. The rotation-transmitting apparatus with a built-in one-way clutch mounted on the electric auxiliary machine for the car is frequently connected to and disconnected from the engine output shaft. When the rotation-transmitting apparatus with the built-in one-way clutch is connected to the engine output shaft, it has a high rotational speed. Consequently a high load is applied to the rotation-transmitting apparatus with the built-in one-way clutch, and it generates a large amount of heat and vibration. The use condition for the rotation-transmitting apparatus with the built-in one-way clutch has become strict as the car has come to have high performance and output.

Because the use condition for the rotation-transmitting apparatus with the built-in one-way clutch has become strict, when rolling bearings rotate, namely, when a roller clutch overruns, the hydrogen brittleness-caused peeling phenomenon is liable to occur with the rolling contact surfaces of balls and the rolling surfaces of inner and outer rings constructing the rolling bearing turning into white in the textures thereof. In addition, when the rolling bearings do not rotate, namely, when the roller clutch is locked, contact portions between the rolling contact surfaces of the balls and the rolling surface of each of the inner and outer rings are liable to be fretted. Therefore grease which is enclosed in a space where the balls are mounted is desired to prevent the generation of the peeling and fretting wear.

The electric auxiliary machine on which the rotation-transmitting apparatus with the built-in one-way clutch is mounted is frequently installed on a lower portion of an engine room. Thus while a car is travelling, rainwater is liable to penetrate into the rotation-transmitting apparatus with the built-in one-way clutch. When the rainwater penetrates into the space in which the balls of rolling bearings are mounted, the rolling contact surfaces of the balls and the rolling surfaces of the inner and outer rings are liable to be corroded. Therefore the grease which is enclosed in the space in which the balls of rolling bearings are mounted is required to have rust-preventing performance superior to that of grease which is used in other portions.

In the one-way clutch of the rotation-transmitting apparatus with the built-in one-way clutch for use in the alternator, the one using grease containing ether oil as its base oil (see patent document 6), the one using grease whose viscosity pressure coefficient is not less than a predetermined value (see patent document 7), and the one using grease containing synthetic oil whose kinematic viscosity at 40° C. is not more than 60 mm$^2$/second as its base oil (see patent document 8) are known.

But in patent document 6, the one-way clutch using the grease containing the ether oil as its base oil has a problem that it has an insufficient low frictional wear property when the one-way clutch is in an overrun state. In the patent document 7, the use of the grease whose viscosity pressure coefficient is not less than the predetermined value is effective for securely realizing a locked state, but has a problem that the grease is incapable of sufficiently restraining wear in the overrun state. In the patent document 8, the grease containing the synthetic oil whose kinematic viscosity is low as its base oil has an insufficient heat resistance. Thus it is difficult to use the grease for a long time.

In a wheel-supporting apparatus for supporting non-drive front wheels of a rear-wheel-drive vehicle, two rolling bearings are mounted on an axle (knuckle spindle) provided on a steering knuckle, a flange is formed on an outside surface of the axle hub rotatably supported by the rolling bearings, and a brake drum and wheel disks of wheels are mounted with a stud bolt provided on the flange and with a nut which engages the stud bolt through a screw. A back plate is mounted on a flange formed on the steering knuckle to support a braking mechanism for imparting a braking force to the braking drum.

In the wheel-supporting apparatus, as a rolling bearing rotatably supporting the axle hub, a tapered roller bearing having a large load-carrying capacity and a high rigidity is used. The tapered roller bearing is lubricated with grease charged between the axle and the axle hub.

Because the bearing for use in the wheel-supporting apparatus is used in the strict condition in which it is operated at a high speed with a large load applied thereto, a bearing ring rib makes a sliding motion on large end faces of rollers and a rib portion, a lubricating oil film consisting of the lubricating grease is liable to be broken. When the lubricating oil film is broken, metal contact occurs and there is an increase in heat generation and frictional wear. Therefore it is necessary to improve the lubricating property and withstand load of the bearing in the condition in which the bearing is rotated at a high speed with a large load applied thereto and prevent the metal contact caused by the breakage of the lubricating oil film. To this end, grease containing an extreme pressure agent is used to decrease the disadvantage.

As an example of the bearing for use in the wheel-supporting apparatus to which a high load is applied at a high-speed operation, a bearing for use in the rolling stock in which grease containing not more than 20 wt % of an organic metal compound containing metal selected from among nickel, tellurium, selenium, copper, and iron for the entire amount of the grease is enclosed is known (see patent document 9).

But as the use condition for the roller bearing has become strict as in the case of lubrication of the roller bearing in a high-speed condition of not less than 100000 in dN value, the use of the conventional grease makes it difficult to use the roller bearing. In the roller bearing for use in the wheel-supporting apparatus, rolling friction is generated between the rolling surfaces of the inner and outer rings and "rollers", and a sliding friction is generated between a rib portion and the "rollers". The sliding friction is larger than the rolling friction. Thus when the use condition is strict, the rib portion is liable to be seized. Consequently it is necessary to perform a grease-replacing work frequently. Thus it is impossible to accomplish a maintenance-free operation.

In addition, in a hydraulic motor, a hydraulic pump, and an axle planetary gear portion, bearings lubricated with gear oil and hydraulic oil are generally used. As these oils, mineral oil and water-glycol hydraulic oil are generally used.

As the use condition for the bearing lubricated with the gear oil and the hydraulic oil has become strict in recent years by operating it at a high speed with a large load applied thereto, similarly to the use of the grease, the hydrogen brittleness-caused peeling phenomenon occurs in an early stage with the rolling surface of the bearing turning into white in its texture.

The hydrogen causing the peeling phenomenon to occur is generated by decomposition of lubricant oil. The hydrogen is generated from the lubricating oil for the following two reasons: (1) decomposition owing to heat and shear and (2) decomposition reaction which takes place with a metal surface newly generated by wear acting as a catalyst. The generated hydrogen penetrates into bearing steel easily, thus causing the peeling to occur owing to the hydrogen brittleness. Which of (1) and (2) affects the generation of the hydrogen to a higher extent depends on a use condition for the bearing. When the generation of the hydrogen is caused mainly by (2), reducing the time period in which the metal surface newly generated by wear is exposed is effective for restraining the generation of the hydrogen. That is, adding an additive which makes the newly generated metal surface inactive immediately to the lubricating oil is effective for restraining the generation of the hydrogen.

As a measure for preventing the occurrence of the hydrogen brittleness-caused peeling phenomenon based on the above-described knowledge, a method of adding a metal salt of nitric acid to base grease (see patent document 10) and a method of adding molybdate to base grease (see patent documents 11 and 12) are known.

But as the recent use condition for the rolling bearing becomes strict, a method of only adding these additives is becoming insufficient.

Patent document 1: Japanese Patent Application Laid-Open No. 2001-65578
Patent document 2: Japanese Patent Application Laid-Open No. 2005-256891
Patent document 3: Japanese Patent Application Laid-Open No. 2003-105366
Patent document 4: Japanese Patent Application Laid-Open No. 3-210394
Patent document 5: Japanese Patent Application Laid-Open No. 2005-42102
Patent document 6: Japanese Patent Application Laid-Open No. 11-82688
Patent document 7: Japanese Patent Application Laid-Open No. 2000-234638
Patent document 8: Japanese Patent Application Laid-Open No. 2000-253620
Patent document 9: Japanese Patent Application Laid-Open No. 10-17884
Patent document 10: Japanese Patent Application Laid-Open No. 2005-29623
Patent document 11: Japanese Patent Application Laid-Open No. 2005-29622
Patent document 12: Japanese Patent Application Laid-Open No. 2005-112901

DISCLOSURE OF THE INVENTION

Problems to be Solved by the Invention

The present invention has been made to solve the above-described problem. Therefore it is an object of the present invention to provide a grease composition capable of effectively preventing a rolling surface of a bearing from having hydrogen brittleness-caused peeling, grease-enclosed bearing in which the grease composition is enclosed, and a rotation-transmitting apparatus with a built-in one-way clutch in which the grease composition is enclosed at a sliding portion.

Means for Solving the Problems

The grease composition of the present invention contains a base grease consisting of a base oil and a thickener; and an additive added to the base grease. The additive contains a bismuth-based additive or a magnesium-based additive.

The grease composition prevents a frictional wear surface of a sliding portion or a newly generated surface of the sliding portion consisting of iron or the like exposed owing to wear from being peeled owing to hydrogen brittleness.

The grease composition forms a film containing iron oxide and a bismuth compound or a magnesium compound on the frictional wear surface of the sliding portion or the newly generated surface consisting of the iron or the like exposed owing to wear.

A mixing ratio of the bismuth-based additive is set to 0.01 to 15 parts by weight for 100 parts by weight of the base grease.

The bismuth-based additive consists of at least one of inorganic bismuth and organic bismuth not containing a sulfur component.

The inorganic bismuth consists of at least one of bismuth powder, bismuth trioxide, bismuth carbonate, and sodium bismuthate.

An average particle diameter of the bismuth powder is 10 to 200 μm.

The organic bismuth is organic acid bismuth.

The organic acid bismuth consists of at least one of bismuth 2-ethylhexylate and bismuth naphthenate.

A mixing ratio of the magnesium-based additive is set to 0.05 to 10 parts by weight for 100 parts by weight of the base grease.

The magnesium-based additive consists of at least one of inorganic magnesium and organic magnesium.

The inorganic magnesium is magnesium powder.

The organic magnesium is magnesium stearate.

The thickener is a urea-based thickener or a lithium soap-based thickener.

The base oil consists of at least one oil selected from alkyldiphenyl ether oil, poly-α-olefin oil, mineral oil, ester oil, and ether oil.

A kinematic viscosity of the base oil at 40° C. is 30 to 200 $mm^2/s$.

A grease-enclosed bearing in which a grease composition is enclosed; and the grease composition is a grease composition of the present invention.

The grease-enclosed bearing is a rolling bearing, for use in an electric auxiliary machine for a car, which rotatably supports a rotational shaft driven by an engine output on a stationary member, wherein the rolling bearing comprises an inner ring and an outer ring; a plurality of rolling elements disposed between the inner ring and the outer ring; and a sealing member, for sealing a grease composition of the present invention on a periphery of the rolling elements, which is provided at openings disposed at both axial ends of the inner ring and the outer ring.

The grease-enclosed bearing is a rolling bearing, for use in a fuel cell system, which rotatably supports a rotational portion of a compressed fluid-feeding machine for feeding a fluid used in the fuel cell system under pressure, wherein the rolling bearing comprises an inner ring and an outer ring; a plurality of rolling elements disposed between the inner ring and the outer ring; and a sealing member, for sealing a grease composition of the present invention on a periphery of the rolling elements, which is provided at openings disposed at both axial ends of the inner ring and the outer ring.

The grease-enclosed bearing is a rolling bearing, for use in a motor, which supports a rotor of a motor, wherein the rolling bearing comprises an inner ring and an outer ring; a plurality of rolling elements disposed between the inner ring and the outer ring; and a sealing member, for sealing a grease composition of the present invention on a periphery of the rolling elements, which is provided at openings disposed at both axial ends of the inner ring and the outer ring.

The grease-enclosed bearing is a rolling bearing, for use in a robot, which rotatably supports a rotational portion of an industrial robot, wherein the rolling bearing comprises an inner ring and an outer ring; a plurality of rolling elements disposed between the inner ring and the outer ring; and a sealing member, for sealing a grease composition of the present invention on a periphery of the rolling elements, which is provided at openings disposed at both axial ends of the inner ring and the outer ring.

The grease-enclosed bearing is a rolling bearing for use in a wheel-supporting apparatus, having a thrust sliding surface, which rotatably supports a rotational member rotating together with wheels through a grease-enclosed rolling bearing mounted on an outside surface of an axle.

A rotation-transmitting apparatus with a built-in one-way clutch including an inside rotational member; a cylindrical outside rotational member disposed concentrically with the inside rotational member; a one-way clutch disposed between an outside surface of the inside rotational member and an inside surface of the outside rotational member and connecting the outside surface of the inside rotational member and the inside surface of the outside rotational member to each other only when the outside rotational member rotates at a higher speed than the inside rotational member; and a pair of rolling bearings disposed at both sides of the one-way clutch in an axial direction thereof and allowing the inside rotational member and the outside rotational member to rotate relative to each other with the rolling bearings receiving a radial load applied between the inside rotational member and the outside rotational member, wherein a grease composition of the present invention is enclosed inside a clutch inside space where a plurality of rollers composing the one-way clutch is mounted and inside a space where a plurality of rolling elements composing the rolling bearings is mounted.

Effect of the Invention

In the grease composition of the present invention, the bismuth-based additive or the magnesium-based additive is added to the base grease consisting of the base oil and the thickener. Therefore it is possible to restrain the metal rolling surface of the bearing from being peeled owing to hydrogen brittleness with the rolling surface turning into white in its texture.

Consequently by enclosing the grease composition of the present invention in the bearing, it is possible to restrain the hydrogen brittleness-caused peculiar peeling from occurring in the rolling bearing for use in an electric auxiliary machine for a car, the bearing for use in a motor, the rolling bearing for use in a fuel cell system, and the like in which the cycle of start—sudden acceleration drive—high speed drive—sudden deceleration drive—sudden stop is frequently repeated. Therefore the bearing can be used for along time. It is also possible to restrain the hydrogen brittleness-caused peculiar peeling from occurring in the rolling bearing for use in a robot in which each time switching of stop—start—drive—stopping operation is made, the rolling bearing is subjected to frequent high accelerations and decelerations because the number of times of the switching of stop—start—drive—stopping operation is large per time. Therefore the rolling bearing can be used for a long time.

The bismuth powder or the like is supplied to the sliding interface of the rolling bearing, for use in the wheel-supporting apparatus, in which the grease composition of the present invention is enclosed. Thereby it is possible to restrain the occurrence of the hydrogen brittleness-caused peculiar peeling and keep the extreme-pressure property effect for a long time. Thus the rolling bearing can be preferably utilized for the wheel-supporting apparatus demanded to have a high wear resistance and durability for a long time.

In addition to the prevention of the occurrence of the hydrogen brittleness-caused peculiar peeling, in the rotation-transmitting apparatus with a built-in one-way clutch of the present invention in which the grease composition of the present invention is enclosed, it is possible to prevent the rolling surface of the roller of the one-way clutch and the rolling surface of the inner and outer rings of the rolling bearing from peeling or from being fretted. Therefore it is possible to maintain the wear resistance and durability of the rotation-transmitting apparatus with a built-in one-way clutch for a long time.

BEST MODE FOR CARRYING OUT THE INVENTION

As a result of energetic investigation of a method of effectively preventing the rolling surface of the grease-enclosed rolling bearing from being peeled by hydrogen brittleness, the present inventors have conducted a sudden acceleration/deceleration test by using a rolling bearing in which the grease composition containing the bismuth-based additive or the magnesium-based additive, and found that the life of the bearing could be prolonged.

It has been found that as a result of the analysis of the surface of the rolling surface of the rolling bearing, by adding the bismuth-based additive or the magnesium-based additive to the base grease, the bismuth-based additive or the magnesium-based additive is decomposed and makes reactions on the frictional wear surface or on the newly generated metal surface which is exposed owing to wear to form a film containing the iron oxide and the bismuth compound or the magnesium compound on the rolling surface of the rolling bearing.

It is considered that the film, containing the iron oxide and the bismuth compound or the magnesium compound, which is formed on the rolling surface of the bearing restrains the generation of hydrogen caused by the decomposition of the grease composition and the penetration of the hydrogen into the bearing steel, thereby preventing the hydrogen brittleness-caused peeling and prolonging the life of the bearing. The present invention is completed on the basis of the above-described findings.

The bismuth-based additive which is added to the grease composition of the present invention is selected from among inorganic bismuth and organic bismuth not containing a sulfur component.

As inorganic bismuth that can be used in the present invention, bismuth powder, bismuth carbonate, bismuth chloride, bismuth nitrate, and hydrates thereof, bismuth sulfate, bismuth fluoride, bismuth bromide, bismuth iodide, bismuth oxyfluoride, bismuth oxychloride, bismuth oxybromide, bismuth oxyiodide, bismuth oxide, and hydrates thereof, bismuth hydroxide, bismuth selenide, bismuth telluride, bismuth phosphate, bismuth oxyperchlorate, bismuth oxysulfate, sodium bismuthate, bismuth titanate, bismuth zirconate, and bismuth molybdate are listed. In the present invention, the bismuth powder, the bismuth trioxide, and the bismuth carbonate are especially favorable because these substances are excellent in resistance to heat, durable, and hardly heat-decomposable and thus have a high extreme-pressure property effect.

These substances serving as the inorganic bismuth may be added to the grease singly or as a mixture of two or more kinds.

The bismuth is a silver white metal, has the lowest heat conductivity of all metals except mercury, has a specific gravity of 9.8, and a melting point of 271.3° C. The bismuth powder is a comparatively soft metal and becomes filmy easily when it is subjected to an extreme pressure. Therefore the particle diameter of the bismuth powder should be so set that it is capable of dispersing in the grease.

For example, it is preferable that the average particle diameter of the bismuth powder which is used for the grease composition to be enclosed in a rolling bearing for use in a wheel-supporting apparatus is 10 to 200 µm. If the average particle diameter of the bismuth powder is less than 10 µm, it has a problem in terms of safety. If the average particle diameter of the bismuth powder is more than 200 µm, noise may be generated. It is preferable that the average particle diameter of the bismuth powder which is used for the grease composition to be enclosed in a rotation-transmitting apparatus with a built-in one-way clutch is 5 to 500 µm.

As the organic bismuth which can be used in the present invention, organic acid bismuth, phenyl bismuth, and the like are listed. The organic bismuth not containing a sulfur component can be used. When the organic bismuth contains the sulfur component, corrosion progresses, and penetration of hydrogen into steel is accelerated, which is unpreferable. Of the organic bismuths above, the organic acid bismuth excellent in its lubricating property is preferable.

As the organic acid which composes the organic acid bismuth, it is possible to use any of aromatic organic acid, aliphatic organic acid, and alicyclic organic acid.

As the organic acids, it is possible to list monovalent saturated aliphatic acid such as formic acid, acetic acid, propionic acid, butyric acid, valeric acid, caproic acid, heptanoic acid, 2-ethylhexyl acid, caprilic acid, pelargonic acid, capric acid, undecylic acid, lauric acid, tridecyl acid, myristic acid, pentadecyl acid, palmitic acid, margaric acid, stearic acid, nonadecyl acid, and arachic acid; monovalent unsaturated aliphatic acid such as acrylic acid, crotonic acid, undecylic acid, oleic acid, gadoleic acid; bivalent saturated aliphatic acid such as malonic acid, methylmalonic acid, succinic acid, methylsuccinic acid, dimethylmalonic acid, ethylmalonic acid, glutaric acid, adipic acid, dimethylsuccinic acid, pimelic acid, tetramethylsuccinic acid, suberic acid, azelaic acid, sebacic acid, brassylic acid; bivalent unsaturated aliphatic acid such as fumaric acid, maleic acid, oleic acid; derivatives of aliphatic acid such as tartaric acid and citric acid: aromatic organic acid such as benzoic acid, phthalic acid, trimellitic acid, and pyromellitic acid; and alicyclic organic acid such as naphthenic acid.

Of these organic acids, it is favorable to use 2-ethylhexylic acid and naphthenic acid excellent in the lubricating property and heat resistance. These substances can be used singly or as a mixture.

The mixing ratio of at least one bismuth-based additive selected from among the inorganic bismuth and the organic bismuth not containing a sulfur component is set to favorably 0.01 to 15 parts by weight for 100 parts by weight of the base grease. More specifically, (1) when the bismuth-based additive consists of only the inorganic bismuth, it is preferable to add 0.01 to 15 parts by weight to 100 parts by weight of the base grease, (2) when the bismuth-based additive consists of only the organic bismuth, it is preferable to add 0.01 to 15 parts by weight to 100 parts by weight of the base grease, and (3) when the bismuth-based additive consists of a combination of the inorganic bismuth and the organic bismuth, it is preferable to add 0.01 to 15 parts by weight of the combination of the inorganic bismuth and the organic bismuth to 100 parts by weight of the base grease.

If the mixing ratio of the bismuth-based additive is less than 0.01 parts by weight, there is a fear that the grease composition is incapable of effectively preventing the hydrogen brittleness-caused peeling from occurring on the rolling surface of the bearing. If the mixing ratio of the bismuth-based additive is more than 15 parts by weight, there is a fear that abnormal wear is generated. If the mixing ratio of the bismuth-based additive is more than 15 parts by weight when the bismuth-based additive is used for the wheel-supporting apparatus or the rotation-transmitting apparatus with a built-in one-way clutch, a torque during rotation becomes large and there is an increase in the generation of heat. Hence there is a fear that a rotation trouble occurs.

The mixing ratio of the bismuth-based additive is set to more favorably 0.05 to 10 parts by weight for 100 parts by weight of the base grease.

The magnesium-based additive to be contained in the grease composition of the present invention consists of at least one of the inorganic magnesium and the organic magnesium.

As inorganic magnesium that can be used in the present invention, magnesium powder, magnesium carbonate, magnesium chloride, magnesium nitrate, and hydrates thereof, magnesium sulfate, magnesium fluoride, magnesium bromide, magnesium iodide, magnesium oxyfluoride, magnesium oxychloride, magnesium oxybromide, magnesium oxyiodide, magnesium oxide, and hydrates thereof, magnesium hydroxide, magnesium selenide, magnesium telluride, magnesium phosphate, magnesium oxyperchlorate, magnesium oxysulfate, magnesium salicylate, magnesium titanate, magnesium zirconate, and magnesium molybdate are listed.

The magnesium powder is especially preferable because it is excellent in its heat resistance and durability and is hardly thermally decomposable and thus has a high extreme-pressure effect.

These substances serving as the inorganic magnesium may be added to the grease singly or as a mixture of two or more kinds.

As the organic magnesium which can be used in the present invention, magnesium salts of organic acids are preferable. As organic acids composing the magnesium salt of organic acid, it is possible to use salts of any of aromatic organic acid, aliphatic organic acid, and alicyclic organic acid.

As the organic acids, it is possible to list monovalent saturated aliphatic acid such as formic acid, acetic acid, propionic acid, butyric acid, valeric acid, caproic acid, heptanoic acid, 2-ethylhexyl acid, caprilic acid, pelargonic acid, capric acid, undecylic acid, lauric acid, tridecyl acid, myristic acid, pentadecyl acid, palmitic acid, margaric acid, stearic acid, nonadecyl acid, and arachic acid; monovalent unsaturated aliphatic acid such as acrylic acid, crotonic acid, undecylic acid, oleic acid, gadoleic acid; bivalent saturated aliphatic acid such as malonic acid, methylmalonic acid, succinic acid, methylsuccinic acid, dimethylmalonic acid, ethylmalonic acid, glutaric acid, adipic acid, dimethylsuccinic acid, pimelic acid, tetramethylsuccinic acid, suberic acid, azelaic acid, sebacic acid, brassylic acid; bivalent unsaturated aliphatic acid such as fumaric acid, maleic acid, oleic acid; derivatives of aliphatic acid such as tartaric acid and citric acid: aromatic organic acid such as benzoic acid, phthalic acid, trimellitic acid, and pyromellitic acid; and alicyclic organic acid such as naphthenic acid. In the present invention, magnesium stearate excellent in lubricating property is especially preferable.

These substances serving as the organic magnesium may be added to the grease singly or as a mixture of two or more kinds.

The mixing ratio of at least one magnesium-based additive selected from among the inorganic magnesium and the organic magnesium is set to favorably 0.05 to 10 parts by weight for 100 parts by weight of the base grease. More specifically, (1) when the magnesium-based additive consists of only the inorganic magnesium, it is preferable to add 0.05 to 10 parts by weight to 100 parts by weight of the base grease, (2) when the magnesium-based additive consists of only the organic magnesium, it is preferable to add 0.05 to 10 parts by weight to 100 parts by weight of the base grease, and (3) when the magnesium-based additive consists of a combination of the inorganic magnesium and the organic magnesium, it is preferable to add 0.05 to 10 parts by weight of the combination of the inorganic magnesium and the organic magnesium to 100 parts by weight of the base grease.

If the mixing ratio of the magnesium-based additive is less than 0.05 parts by weight, there is a fear that the grease composition is incapable of effectively preventing the hydrogen brittleness-caused peeling from occurring on the rolling surface of the bearing. If the mixing ratio of the magnesium-based additive is more than 10 parts by weight, there is a fear that there is no increase in peeling-restraining effect and thus the producing cost becomes high, thus causing defective lubrication. Thereby fatigue peeling occurs from the surface of the rolling surface. In addition, if the mixing ratio of the magnesium-based additive is more than 10 parts by weight, there is a fear that abnormal wear occurs.

The mixing ratio of the magnesium-based additive is set to more favorably 0.05 to 5 parts by weight for 100 parts by weight of the base grease.

As the base oil which can be used in the present invention, it is possible to list mineral oil such as spindle oil, refrigeration oil, turbine oil, machine oil, dynamo oil; hydrocarbon synthetic oil such as highly refined mineral oil, liquid paraffin, GTL base oil synthesized by Fischer-Tropsh method, polybutene, poly-α-olefin oil (PAO oil), alkylnaphthalene, alicyclic compounds; non-hydrocarbon synthetic oil such as natural fats and oils, polyol ester oil, phosphate ester oil, polymer ester oil, aromatic ester oil, carbonate ester oil, diester oil, polyglycol oil, silicone oil, polyphenyl ether oil, alkyldiphenyl ether oil, alkylbenzene oil, fluorinated oil; and water-based lubricating oil such as water-glycol hydraulic oil.

Of these base oils, it is preferable to use the alkyldiphenyl ether oil, the poly-α-olefin oil, the polyol ester oil, and the mineral oil excellent in the heat resistance and the lubricating property.

As the above-described PAO oil, mixtures of oligomers or polymers consisting of α-olefin or isomerized α-olefin are listed. As examples of the α-olefin, it is possible to list 1-octane, 1-nonen, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetracosene. Normally mixtures of these substances are used. As the mineral oil, it is possible to use any of normal lubricants such as paraffin mineral oil, naphthene mineral oil, and the like and those used in the field of grease.

It is preferable that the base oil which can be used for the grease composition to be enclosed in the grease-enclosed bearing of the present invention has a kinematic viscosity of 30 to 200 mm$^2$/s at 40° C. It is not preferable that the base oil has a kinematic viscosity less than 30 mm$^2$/s because the evaporation loss thereof increases and resistance thereof to heat deteriorates. It is not preferable that the kinematic viscosity of the base oil exceeds 200 mm²/s because the temperature of the bearing rises greatly owing to an increase in a rotational torque.

It is preferable that the base oil which can be used for the grease to be enclosed in the rotation-transmitting apparatus with a built-in one-way clutch of the present invention has a kinematic viscosity of 30 to 70 mm²/s and especially favorably 40 to 60 mm²/s at 40° C. It is not preferable that the base oil has a kinematic viscosity less than 30 mm²/s because the evaporation loss thereof increases and resistance thereof to heat deteriorates. It is not preferable that the kinematic viscosity of the base oil exceeds 70 mm²/s because owing to an increase in a rotational torque, the temperature of the rolling contact surface of the roller of the clutch and that of the rolling contact surface of the ball of the rolling bearing rise greatly.

As thickeners that can be used in the present invention, it is possible to use soaps such as Benton, silica gel, fluorine compounds, lithium soap, lithium complex soap, sodium soap, calcium soap, calcium complex soap, aluminum soap, aluminum complex soap; and urea-based compounds such as a diurea-based compound, a polyurea-based compound, and the like. These thickeners can be used singly or in combination of two or more kinds.

Of these thickeners, the lithium-based soap and the urea-based compounds are favorable. The urea-based compound is especially favorable in consideration of heat resistance, cost, and the like.

Of the above-described urea-based compound, diurea-based compounds shown by a formula (1) shown below is more favorable.

[Chemical formula 1]

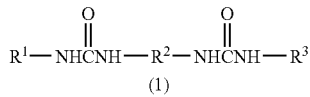

(1)

$R_1$ and $R_3$ in the formula (1) indicates hydrocarbon radicals having carbon atoms of 6 to 20. $R_1$ and $R_3$ may be identical to or different from each other. $R_2$ indicates aromatic hydrocarbon radical having carbon atoms of 6 to 15. It is preferable that $R_1$ and $R_3$ are aromatic hydrocarbon radicals having carbon atoms of 6 to 12, alicyclic hydrocarbon radicals having carbon atoms of 6 to 20, or aliphatic hydrocarbon radicals having carbon atoms of 6 to 20.

The urea-based compound is obtained by a reaction between an isocyanate compound and an amine compound. To prevent are active free radical from remaining, it is preferable to use the isocyanate group of the isocyanate compound and the amino group of the amine compound in an approximately equivalent weight.

The diurea-based compound indicated by the formula (1) is obtained by reaction of diisocyanate and monoamine. As the diisocyanate, phenylene diisocyanate, diphenyl diisocyanate, diphenylmethane diisocyanate, 1,5-naphthylene diisocyanate, 2,4-trilene diisocyanate, 3,3-dimethyl-4,4-biphenylene diisocyanate, octadecane diisocyanate, decane diisocyanate, and hexane diisocyanate are listed. As the monoamine, octyl amine, dodecyl amine, hexadecyl amine, stearyl amine, oleyl amine, aniline, p-toluidine, and cyclohexyl amine are listed.

The polyurea-based compound is obtained by reaction between the diisocyanate and monoamine as well as diamine. As the diisocyanate and the monoamine, substances similar to those described above used to form the diurea-based compound are listed. As the diamine, ethylenediamine, propanediamine, butanediamine, hexanediamine, octanediamine, phenylenediamine, tolylenediamine, xylenediamine, and diaminodiphenylmethane are listed.

By adding the thickener such as the above-described urea-based compound to the base oil, it is possible to obtain the base grease to which the above-described bismuth-based additive or the magnesium-based additive is added.

As the mixing ratio between the thickener and the base grease, favorably 1 to 40 parts by weight of the thickener and more favorably 3 to 25 parts by weight thereof is contained in 100 parts by weight of the base grease. If the content of the thickener is less than 1 part by weight, thickening effect is mall and greasing is difficult. If the content of the thickener is more than 40 parts by weight, obtained grease is so hard that it is difficult to obtain a desired effect.

It is preferable that the worked penetration of the grease which is enclosed in the rotation-transmitting apparatus with a built-in one-way clutch of the present invention is in the range from 200 to 400. The worked penetration is measured in accordance with JIS K 2220. If the worked penetration is less than 200, the lubricating performance of the grease composition at a low temperature is low. If the worked penetration exceeds 400, the grease composition is liable to leak, which is not preferable.

As may be necessary, known additives for grease can be contained together with the bismuth-based additive or the magnesium-based additive. As additives that can be added to the grease, it is possible to use an antioxidant such as an organic zinc compound, antioxidants containing amine, phenol; a metal-inactivating agent such as benzotriazole; a viscosity index improver such as polymethacrylate and polystyrene; a solid lubricant such as molybdenum disulfide and graphite; a corrosion inhibitor such as metal sulfonate and polyvalent alcohol ester; a friction-reducing agent such as organic molybdenum; an oily agent such as ester and alcohol; and wear-preventing agent such as a phosphorous compound. These additives can be added to the grease singly or in combination.

The grease composition of the present invention is capable of restraining the hydrogen brittleness-caused peculiar peeling. Therefore it is possible to prolong the life of the bearing lubricated with the lubricant composition. Thus the lubricant composition of the present invention can be used for a ball bearing, a cylindrical roller bearing, a tapered roller bearing, an automatic belt-training roller bearing, a needle-shaped roller bearing, a thrust cylindrical roller bearing, a thrust tapered roller bearing, a thrust needle-shaped roller bearing, and a thrust automatic belt-training roller bearing.

A grease-enclosed bearing in which the grease composition of the present invention is enclosed is described with reference to FIG. 1. FIG. 1 is a sectional view of a deep groove ball bearing. For example, a rolling bearing for use in an electric auxiliary machine for a car rotatably supporting a rotary shaft driven by an engine output on a stationary member, a grease-enclosed bearing for use in a motor supporting a rotor of a motor, a rolling bearing for use in a robot rotatably supporting a rotational portion of an industrial robot, and a rolling bearing for a fuel cell system are exemplified.

In a grease-enclosed bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. A sealing member 6 fixed to a cage 5 holding the rolling elements 4 and to the outer ring 3 is provided at openings 8a and 8b disposed at both axial ends of the inner ring 2 and the outer ring 3. A grease composition 7 is essentially applied to the peripheries of rolling elements 4.

It has been found that the life of the grease-enclosed bearing in which the grease composition containing the bismuth-based additive or the magnesium-based additive of the present invention is enclosed has a long life. Observing the bearing rolling surface of the grease-enclosed bearing, it has been found that the bismuth-based additive or the magnesium-based additive is decomposed and has a reaction on the frictional wear surface of the bearing or the newly generated surface consisting of an iron-based metal exposed owing to wear to form a film containing iron oxide and a bismuth compound or a magnesium compound on the rolling surface of the bearing. It is conceivable that the generated film prevents hydrogen generated by the decomposition of the base oil or the like from penetrating into the bearing steel, thereby restraining hydrogen brittleness-caused peeling.

FIGS. 2 and 3 show an example of an electric auxiliary machine for a car in which a rolling bearing for use in the electric auxiliary machine for the car is used. FIG. 2 is a sectional view of a fan coupling apparatus. Inside a casing 10 supporting a cooling fan 9 of the fan-coupling apparatus, there are provided an oil chamber 11 in which a viscous fluid such as silicone oil is filled and a stirring chamber 12 in which a drive disk 18 is incorporated. A port 14 is formed on a partitioning plate 13 interposed between both chambers 11 and 12. An end of a spring 15 for opening and closing the port 14 is fixed to the partitioning plate 13.

A bimetal 16 is mounted on a front surface of the casing 10. A piston 17 of the spring 15 is provided on the bimetal 16. When the temperature of air that has passed through a radiator is not more than a set temperature, for example, 60° C., the bimetal 16 becomes flat. As a result, the piston 17 presses the spring 15, and the spring 15 closes the port 14. When the temperature of the air exceeds the set temperature, the bimetal 16 curves outward as shown in FIG. 3. As a result, the piston 17 does not press the spring 15. Thus the spring 15 deforms elastically and opens the port 14.

Supposing that the temperature of the air that has passed through the radiator is lower than the set temperature of the bimetal 16 when the fan-coupling apparatus having the above-described construction is operated, as shown in FIG. 2, the viscous fluid inside the oil chamber 11 does not flow into the stirring chamber 12 because the port 14 is closed with the spring 15. At this time, the viscous fluid inside the stirring chamber 12 is fed from a circulation hole 19 formed on the partitioning plate 13 into the oil chamber 11 owing to a rotation of the drive disk 18.

Therefore the amount of the viscous fluid inside the stirring chamber 12 becomes slight. Because a shear resistance of the viscous fluid generated owing to the rotation of the drive disk 18 becomes small, a decreased torque is transmitted to the casing 10. Thus the fan 9 rotates at a low speed.

When the temperature of the air that has passed through the radiator exceeds the set temperature of the bimetal 16, as shown in FIG. 3, the bimetal 16 curves outward, and the piston 17 does not press the spring 15. At this time, the spring 15 deforms elastically in a direction in which the spring 15 moves away from the partitioning plate 13. Thus the port 14 is opened. Thereby the viscous fluid inside the oil chamber 11 flows into the stirring chamber 12 from the port 14.

Therefore the shear resistance of the viscous fluid generated owing to the rotation of the drive disk 18 becomes large. Thus an increased rotational torque is transmitted to the casing 10, and the fan 9 supported by the rolling bearing rotates at a high speed.

As described above, since in the fan-coupling apparatus, the rotational speed of the fan 9 changes in dependence on the change of temperature, warming-up is made fast, and overcooling of cooling water is prevented. Thereby the engine can be effectively cooled. When the temperature of the engine is low, the fan 9 is placed in a state in which the fan 9 is disconnected from a driving shaft 20. On the other hand, when the temperature of the engine is high, the fan 9 is placed in a state in which the fan 9 is connected to the driving shaft 20. As such, the grease-enclosed rolling bearing 1 is used in a wide range from a low temperature to a high temperature and in a wide range of rotation.

FIG. 4 shows an example of an alternator that is an electric part for use in a vehicle. FIG. 4 is a sectional view of the alternator. In the alternator, through a pair of grease-enclosed rolling bearings 1, a rotating shaft 23 on which a rotor 22 is mounted is rotatably supported by a pair of stationary frames 21a and 21b which form a housing. A rotor coil 24 is mounted on the rotor 22. A stator coil 26 of three rolls is mounted at a phase of 120 degrees on a stator 25 disposed on the periphery of the rotor 22.

A rotational shaft 23 of the rotor 22 is driven by a rotational torque transmitted to a pulley 27 mounted on the front end thereof through a belt (not shown in FIG. 3). The pulley 27 is mounted on the rotational shaft 23 in a cantilevered state. Vibrations are generated when the rotational shaft 23 rotates at a high speed. Thus a grease-enclosed rolling bearing 1 supporting the pulley 27 is subjected to a very high load.

FIG. 5 shows an example of an idler pulley used as a belt tensioner which tensions a belt for driving the auxiliary parts of the car. FIG. 5 is a sectional view showing the construction of the idler pulley.

The pulley has a body 28 made of a steel plate press and a grease-enclosed rolling bearing 1 which is a one-row deep groove ball bearing fitted on the inner periphery of the body 28. The body 28 is an annular body constructed of an inner cylindrical part 28a, a flange part 28b extending from one end of the inner cylindrical part 28a to the periphery of the body 28, an outer cylindrical part 28c extending axially from the flange part 28b, and a collar 28d extending from the other end of the inner cylindrical part 28a to the inner periphery of the body 28. An outer ring 3 of the grease-enclosed rolling bearing 1 is fitted on the inner periphery of the inner cylindrical part 28a. A peripheral surface 28e that contacts a belt driven by the engine is provided on the periphery of the outer cylindrical part 28c. The peripheral surface 28e is brought into contact with the belt to allow the pulley to serve as an idler.

The grease-enclosed rolling bearing 1 has the outer ring 3 fitted on the inner periphery of the inner cylindrical part 28a of the body 28, an inner ring 2 fitted on an unshown fixed shaft, a plurality of rolling elements 4 disposed between a transfer surface 2a of the inner ring 2 and a transfer surface 3a of the outer ring 3, a holder 5 for holding the rolling elements 4 circumferentially at regular intervals, and a pair of sealing members 6 sealing the grease. The inner ring 2 and the outer ring 3 are formed integrally.

By adding the bismuth-based additive or the magnesium-based additive to the grease composition used for the rolling bearing for the electric auxiliary machine for a car, the additives make reactions on the frictional wear surface or on the newly generated surface of metal exposed owing to wear to form the film containing the iron oxide and the bismuth compound or the magnesium compound on the rolling surface of the bearing. The film containing the iron oxide and compounds generated on the rolling surface of the bearing restrains the generation of hydrogen caused by the decomposition of the base oil and prevents the occurrence of the hydrogen brittleness-caused peculiar peeling.

FIG. 6 shows an example of a motor in which a grease-enclosed bearing for use in a motor is enclosed. FIG. 6 is a sectional view showing the construction of the motor. The motor has a stator 102 consisting of a magnet, for the motor, disposed on the inner peripheral wall of a jacket 101, a rotor 105 on which a coil 104 fixed to a rotating shaft 103 is wound, a commutator 106 fixed to the rotating shaft 103, a brush holder 107 disposed on an end frame 109 supported by the jacket 101, and a brush 108 accommodated inside the brush holder 107. The rotating shaft 103 is rotatably supported on the jacket 101 by a grease-enclosed bearing 1 and a supporting construction for the bearing 1.

General-purpose motors such as an AC motor, a DC motor, and the like have become smaller. Hence there is a tendency that the bearing is driven under a higher surface pressure. The following motors are subjected to frequent repetition of start—sudden acceleration operation—high-speed operation—sudden deceleration operation—sudden stop: electric motors for industrial machines such as a servo motor; and motors for electric apparatuses such as a starter motor for a vehicle, an electromotive power steering motor, a steering-adjusting tilt motor, a blower motor, a wiper motor, a power window motor. Thus rolling bearings for motors have sliding to a higher extent. As the use conditions of the motors have become strict, the peculiar peeling phenomenon occurs in an early stage with the rolling surface of the bearing turning into white in its texture. Therefore the rolling bearing for use in the motor is demanded to have durability which enables the rolling bearing to be driven stably for a long time and have reliability.

By adding the bismuth-based additive or the magnesium-based additive to the grease composition used for the rolling bearing for the motor, the additives make reactions on the frictional wear surface or the newly generated surface of metal exposed owing to wear to form the film containing the iron oxide and the bismuth compound or the magnesium compound on the rolling surface of the bearing. The film containing the iron oxide and compounds generated on the rolling surface of the bearing restrains the generation of hydrogen caused by the decomposition of the base oil and prevents the penetration of hydrogen which can be generated because water contained in air inside the bearing is electrolyzed by electric current flowing the motor, thus preventing the occurrence of the hydrogen brittleness-caused peeling.

FIG. 7 shows an example of a compressed fluid-feeding machine in which the rolling bearing for use in a fuel cell system is used. FIG. 7 is a sectional view of an impeller-type compressed fluid-feeding machine for use in a fuel cell car. Arrows shown with one-dot chain line in FIG. 7 indicate a direction in which a gas flows.

As shown in FIG. 7, the impeller-type compressed fluid-feeding machine is so constructed that a rotation shaft 202 to which an impeller 201 is fixed is supported on a casing 203 by means of a plurality of rolling bearings 1 axially disposed at certain intervals. When the rotation shaft 202 rotates at a high speed upon receipt of a power of a motor or the like, the impeller 201 also rotates at a high speed. Thereby a gas sucked from a gas-sucking port 204 is pressurized by a centrifugal force of the impeller 201 and fed under pressure from a gas-discharging port 207 through a pressure volute 206 formed with the casing 203 and a back plate 205.

To prevent the gas from leaking from the pressure volute 206 to the grease-enclosed bearing 1, the back plate 205 and the rotation shaft 202 are sealed with the seal ring 209 interposed therebetween. But in the impeller-type compressed fluid-feeding machine, when the sealing performance of the seal ring 209 deteriorates owing to a high-speed rotation of the rotation shaft 202, the gas reaches the bearing 1 from a rear space 208 disposed rearward from the impeller 201 through a gap 210 between the rotation shaft 202 and the seal ring 209. To prevent the occurrence of this phenomenon, a mechanical seal 211 is provided. Regarding the sealing performance of the mechanical seal 211, a sliding-contact surface between the mechanical seal 211 and the rotation shaft 202 is lubricated with vapor contained in the gas. Thus as it stands, the vapor leaks and penetrates into the bearing 1. As a result of the penetration of the vapor or the like into the bearing 1, there is a fear that the bearing 1 deteriorates. Therefore in the rolling bearing of the present invention for use in the fuel cell system, to prevent the penetration of the vapor from the impeller 202 into the bearing 1 and prevent the leak of the grease composition 7 (see FIG. 1) enclosed inside the bearing 1, the bearing 1 is provided with the sealing member 6 (see FIG. 1) resistant to hydrogen brittleness.

By adding the bismuth-based additive or the magnesium-based additive to the grease composition used for the rolling bearing for use in the fuel cell system, the additives make reactions on the frictional wear surface or the newly generated surface of metal exposed owing to wear to form the film containing the iron oxide, and the bismuth compound or the magnesium compound on the rolling surface of the bearing. The film containing the iron oxide and compounds generated on the rolling surface of the bearing restrains the generation of hydrogen caused by the decomposition of the base oil and prevents the penetration of hydrogen which can be generated because water constantly supplied to the fuel cell system is electrolyzed, thus preventing the occurrence of the hydrogen brittleness-caused peculiar peeling.

A wheel-supporting apparatus using the rolling bearing in which the grease composition of the present invention is enclosed is described below with reference to FIG. 8. FIG. 8 is a sectional view of the wheel-supporting apparatus.

As shown in FIG. 8, a flange 302 and an axle 303 are provided on a steering knuckle 301, and an axle hub 305 serving as a rotary member is rotatably supported by a pair of tapered roller bearings 304a, 304b mounted on an outside-diameter surface of the axle 303. The axle hub 305 has a flange 306 on its outside-diameter surface. A braking drum 309 of a braking apparatus and a wheel disk 310 of a wheel are mounted by a stud bolt 307 provided on the flange 306 and a nut 308 engaging the stud bolt 307 with a screw. Reference numeral 311 denotes a rim mounted on the outside-diameter surface of the wheel disk 310. A tire is mounted on the rim.

A back plate 312 of the braking apparatus is mounted on a flange 302 of the steering knuckle 301 by tightening a bolt and a nut. A braking mechanism for imparting a braking force to the braking drum 309 is supported on the back plate 312. The braking mechanism is not drawn in FIG. 8. A pair of the above-described tapered roller bearings 304a, 304b rotatably supporting the axle hub 305 is lubricated by grease filled up inside the axle hub 305. To prevent the grease from leaking from the tapered roller bearing 304b and muddy water from penetrating into the rolling bearing from the outside, a grease cap 317 is mounted on an outer end surface of the axle hub 305, with the grease cap 317 covering the tapered roller bearing 304b.

One example of the tapered roller bearing which is the grease-enclosed bearing of the present invention for use in the wheel-supporting apparatus is described below with reference to FIG. 9. FIG. 9 is a partly cut-out perspective view of the tapered roller bearing.

In a tapered roller bearing 304, a tapered roller 316 is disposed between the inner ring 314 and the outer ring 313 via the cage 315. The tapered roller 316 is subjected to rolling friction between the rolling surface 314a of the inner ring 314 and the rolling surface 313a of the outer ring 313, and subjected to sliding friction between the flange portions 314b and 314c of the inner ring 314. To reduce the rolling and sliding frictions and the hydrogen brittleness-caused peeling phenomenon on the rolling surface, the grease composition of the present invention for use in the roller bearing is enclosed therein.

As a result of investigation for the improvement of the lubricating property and withstand load of a rolling bearing for use in a wheel-supporting apparatus at a high speed and a high load, it has been found that a rolling bearing in which grease containing 0.01 to 15 wt % of bismuth powder added to the entire grease is enclosed is worn to a lower extent and has a higher long-term durability when a high load is applied thereto with the rolling bearing subjected to a sliding motion than a rolling bearing in which grease containing an additive other than the bismuth powder is enclosed.

This is because the bismuth powder is superior to other substances in the heat resistance and durability and undergoes less chemical change. Thus it is considered that the bismuth powder is capable of keeping an extreme-pressure property effect for a long time. Further the film, containing the iron oxide and the bismuth compound or the like, which is generated on the rolling surface of the bearing prevents the occurrence of the hydrogen brittleness-caused peeling.

A rotation-transmitting apparatus with a built-in one-way clutch for which the grease composition of the present invention is used is described below with reference to FIG. 10. FIG. 10 is a sectional view showing the rotation-transmitting apparatus with a built-in one-way clutch.

The rotation-transmitting apparatus with a built-in one-way clutch has a pulley 403 (outside rotational member) and a sleeve 402 (inside rotational member) 402 as a pair of rotational members disposed concentrically. A pair of grease-enclosed bearings 1, 1 and a roller clutch 404 which is a one-way clutch are provided between an inside surface of the pulley 403 and an outside surface of the sleeve 402.

The pulley 403 is formed entirely cylindrically, and by waving a sectional configuration of the outside surface thereof in a widthwise direction thereof, a part of an annular belts called a poly V-belt can be spanned freely. The sleeve 402 is formed entirely cylindrically and is fixedly fitted on a rotational shaft of an auxiliary machine such as an alternator to freely rotate the sleeve 402 together with the rotational shaft. At both ends of a cylindrical space disposed between the inside surface of the pulley 403 and the outside surface of the sleeve 402, the grease-enclosed bearings 1, 1 are mounted at a position where the roller clutch 404 is sandwiched between both sides thereof in the axial direction thereof, and the roller clutch 404 is installed at an intermediate portion of the cylindrical space in its axial direction.

The roller clutch 404 freely transmits a rotational force between the pulley 403 and the sleeve 402 only when the pulley 403 rotates in a predetermined direction relative to the sleeve 402. The roller clutch 404 is constructed of an inner ring 405 for the clutch, an outer ring 406 for the clutch, a plurality of rollers 407, a cage 408 for the clutch, and an unshown spring. The outer ring 406 for the clutch and the inner ring 405 for the clutch are fixedly fitted on the inside surface of the intermediate portion of the pulley 403 and the outside surface of the intermediate portion of the sleeve 402 respectively by shrink fit. The inside surface of the intermediate portion of the outer ring 406 for the clutch is set as merely a cylindrical surface. The outside surface of the inner ring 405 for the clutch is formed as a cam surface 409. That is, a plurality of concavities 410 called a lamp portion is formed at regular intervals in the circumferential direction of the outside surface of the inner ring 405 for the clutch to form the outside surface of the inner ring 405 for the clutch as the cam surface 409.

Between the inside surface of the intermediate portion of the outer ring 406 and the cam surface 409, a plurality of the rollers 407 and the cage 408, for the clutch, for supporting the rollers 407 in correspondence to rolling thereof and a small amount of displacement thereof in the circumferential direction thereof. The cage 408 for the clutch is entirely made of synthetic resin. An inner peripheral edge of the cage 408 for the clutch is engaged by a part of the cam surface 409 to prevent the cage 408 from rotating relatively to the inner ring 405 for the clutch. In the example shown in FIG. 10, a convexity 411 formed on the inside surface of an end of the cage 408 for the clutch is sandwiched between a level-different surface 412 formed on the outside surface of the sleeve 402 and an axial end surface of the inner ring 405 for the clutch to axially place the cage 408 for the clutch in position. Between the rollers 407 and the cage 408 for the clutch, a spring (not shown) for pressing the rollers 407 in the same direction (direction in which the concavities 410 become shallow) as the circumferential direction is provided.

In constructing the roller clutch 404, there is a case in which the cylindrical surface and the cam surface 409 which contact a plurality of the rollers 407 are directly formed on the inside surface of the pulley 403 and the outside surface of the sleeve 402 respectively. There is also a case in which the position of the radial disposition of the cylindrical surface and that of the cam surface 409 are opposite to that in the above-described construction.

A pair of the grease-enclosed bearings 1, 1 allow the pulley 403 to rotate relative to the sleeve 402 with the grease-enclosed bearings 1, 1 supporting a radial load applied to the pulley 403. As the grease-enclosed bearings 1, 1, deep groove ball bearings are used in FIG. 10. That is, as shown in detail in FIG. 1 which is a sectional view of the deep groove ball bearing, each of the rolling bearings 1, 1 has an inner ring 2 having a deep-groove inner ring rolling surface 2a on its outside surface and fixedly fitted on both ends of a sleeve 9, an outer ring 3 having a deep-groove outer ring rolling surface 3a on its inside surface and fixedly fitted on both ends of a pulley 403, and a plurality of rolling elements (balls) 4 which can be rolled freely and disposed between the inner ring rolling surface 2a and the outer ring rolling surface 3a with the rolling elements 4 held by a cage 5. Both-end openings of a space, where balls 4 are provided, which is disposed between the outside surface of the inner ring 2 and the inside surface of the outer ring 3 are sealed with a sealing member 6. Thereby it is possible to prevent a grease 7 enclosed in the space where the balls 4 are provided from leaking to the outside and prevent a foreign matter such as dust from penetrating into the space.

In the rotation-transmitting apparatus with a built-in one-way clutch having the above-described construction, the sleeve 402 is fixedly fitted on the end of the rotational shaft of an electric auxiliary machine for a car such as an alternator, and the annular belt is spanned over the outside surface of the pulley 403. The annular belt is spanned on a driving pulley fixed to an end of a crankshaft of an engine and is driven by rotation of the driving pulley. In the rotation-transmitting apparatus with a built-in one-way clutch in which the component parts are assembled in this manner, when the travel speed of the annular belt becomes low, the rotation of the pulley 403 relative to the rotational shaft is free. On the other hand, when the travel speed of the annular belt is constant or becomes high, the rotational force is freely transmitted from the pulley 403 to the rotational shaft. Consequently even when the rotational angular speed of the crankshaft fluctuates, it is possible to prevent the pulley 403 and the annular belt from rubbing each other, an abnormal sound called judder from being generated, the life of the annular belt from being decreased by wear, and the alternator from deteriorating in its power generation efficiency.

Supposing that one of the electric motor of the electric auxiliary machine for a car and the engine is in operation and the other is in a stopped state, by using the rotation-transmitting apparatus with a built-in one-way clutch, it is possible to freely transmit the rotational force from the rotational shaft of one of the electric motor and the engine to the pulley 403 and prevent the rotation of the rotational shaft of the other. For example, by mounting the rotation-transmitting apparatus with a built-in one-way clutch on the end of the electric motor of the electric auxiliary machine for a car and on the end of the driving shaft of the crankshaft, the rotation-transmitting apparatus with a built-in one-way clutch can be utilized as an auxiliary machine-driving apparatus when the engine is at an idle stop time.

In the rotation-transmitting apparatus with a built-in one-way clutch, investigating the grease to be enclosed in a space inside the clutch where a plurality of rollers constructing the one-way clutch is provided and a space where a plurality of rolling elements constructing the rolling bearing is provided, it has been found that when a high load is applied to the rolling bearing during a sliding motion, the rolling bearing mounted in the rotation-transmitting apparatus with a built-in one-way clutch for which the grease containing 0.01 to 15 wt % of the inorganic bismuth is used for the entire grease has a lower degree of wear and has a longer life than the rolling bearing mounted in the rotation-transmitting apparatus with a built-in one-way clutch for which the grease containing an additive other than the inorganic bismuth.

This is because the inorganic bismuth is superior to substances other than the inorganic bismuth in the heat resistance and durability and less heat-decomposable. Thus it is considered that the bismuth powder is capable of keeping an extreme-pressure property effect for a long time. Further the film, containing the iron oxide and the bismuth compound or the like, which is generated on the rolling surface of the bearing prevents the occurrence of the hydrogen brittleness-caused peeling.

A lubricating oil composition whose base oil contains the magnesium-based additive of the present invention is capable of preventing hydrogen brittleness-caused peeling similarly to the grease composition.

As the base oil of the lubricating oil composition, both water-based lubricating oil and non-water-based lubricating can be used so long as they are used widely. More specifically, it is possible to use the same base oil as that used for the above-described grease composition. When a low friction is demanded, a favorable result is obtained by using ester oil, silicone oil, or the like.

The inorganic magnesium and the organic magnesium are little dissolved in lubricating oil. Thus by pulverizing them or adding a dispersing agent to the base oil, the inorganic magnesium and the organic magnesium are capable of displaying the effect of restraining the hydrogen brittleness-caused peeling to a high extent.

In the lubricating oil composition, the mixing ratio of at least one magnesium-based additive selected from among the inorganic magnesium and the organic magnesium is set to favorably 0.01 to 10 parts by weight for the entire lubricating oil composition. More specifically, (1) when the magnesium-based additive consists of only the inorganic magnesium, it is preferable to add 0.01 to 10 parts by weight of the inorganic magnesium to the entire lubricating oil composition, (2) when the magnesium-based additive consists of only the organic magnesium, it is preferable to add 0.01 to 10 parts by weight of the organic magnesium to the entire lubricating oil composition, and (3) when the magnesium-based additive consists of a combination of the inorganic magnesium and the organic magnesium, it is preferable to add 0.01 to 10 parts by weight of the combination of the inorganic magnesium and the organic magnesium to the entire lubricating oil composition.

The mixing ratio of the magnesium-based additive is set to more favorably 0.01 to 5 parts by weight for the entire lubricating oil composition. If the mixing ratio of the magnesium-based additive is less than 0.01 parts by weight, the lubricating oil composition is incapable of effectively preventing the hydrogen brittleness-caused peeling from occurring on the rolling surface of the bearing. If the mixing ratio of the magnesium-based additive is more than 10 parts by weight, there is a fear that there is no increase in peeling-restraining effect and thus the producing cost becomes high, thus causing defective lubrication. Thereby fatigue peeling occurs from the surface of the rolling surface.

The lubricating oil composition is capable of containing the following known additives to the lubricant composition as necessary, provided that the additives are used in a range in which they do not prevent the film containing the magnesium compound from being formed on the newly generated surface, consisting of the iron-based metal, which is exposed on the frictional wear surface: antioxidant, corrosion inhibitor, oily agent, viscosity index improver, pour point depressant, antifoamer, emulsifying agent, metal-inactivating agent, and detergent-dispersant.

When the water-based lubricating oil is used, it is preferable to add a proper amount of the corrosion inhibitor thereto to prevent rust from being generated on bearing steel. As the corrosion inhibitors, carboxylic acid, carboxylate, sulfonate, amine, alkenylsuccinic acid, partially esterified alkenylsuccinic acid, and the like can be listed.

FIG. 12 shows an example of a rolling bearing for which the lubricating oil composition is used. FIG. 12 is a perspective view showing an example of a shell type needle-shaped roller bearing.

A needle-shaped roller bearing 601 includes an outer ring 602 formed from a steel plate by means of precision deep-drawing processing or the like and a needle-shaped roller 603, provided with a holder 604, which is incorporated in the outer ring 602. The needle-shaped roller bearing 601 allows a shaft to be used as a raceway surface and is frequently lubricated with the lubricating oil composition.

EXAMPLES

Examples 1-1 Through 1-5

4,4'-diphenylmethane diisocyanate (commercial name: Millionate MT, hereinafter referred to as MDI produced by Nippon Polyurethane Industry Co., Ltd.) was dissolved in one half of a base oil shown in table 1-1 at a ratio shown in table 1-1. Monoamine was dissolved in the remaining half of the base oil at an equivalent weight two times larger than that of the MDI. The mixing ratio and the kind of each of the MDI and the monoamine is as shown in table 1-1.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

Organic bismuth and an antioxidant were added to the base oil at a mixing ratio shown in table 1-1. The base oil was stirred at 100 to 120° C. for 10 minutes. Thereafter the base oil was cooled and homogenized by a three-roll mill to obtain a grease composition.

In table 1-1, as synthetic hydrocarbon oil and alkyldiphenyl ether oil used as the base oil, Shin-fluid 801 (commercial name), produced by Nippon Steel Chemical Co., Ltd., which has a kinematic viscosity of 47 $mm^2$/second at 40° C. and Moresco Hilube LB100 (commercial name), produced by Matsumura Oil Research Corp., which has a kinematic viscosity of 97 $mm^2$/second at 40° C. were used respectively. As the antioxidant, hindered phenol produced by Sumitomo Chemical Co., Ltd. was used.

A sudden acceleration/deceleration test 1 was conducted on the obtained grease compositions. The test method and the test condition are shown below. The results are shown in table 1-1.

<Sudden Acceleration/Deceleration Test 1>

The sudden acceleration/deceleration test 1 was conducted on a rolling bearing, having an inner ring which rotates, which supports the rotating shaft of an alternator which is an example of an electric auxiliary machine. The condition of the sudden acceleration/deceleration test 1 was that as the drive condition, a load of 3234 N was applied to a pulley mounted on the tip of the rotational shaft of the alternator, and the rotational speed was set to 0 to 18000 rpm. The time (lifetime limited by occurrence of peculiar peeling, h) when a generator stopped because peculiar peeling occurred inside the bearing and vibration of a vibration detector exceeded a predetermined value was measured.

Comparative Examples 1-1 Through 1-5

Similarly to the method of the example 1-1 and at a mixing ratio shown in table 1-1, base grease was prepared by selecting a thickener and a base oil and in addition, an additive was added to the base grease to obtain a grease composition of each comparative example. A test was conducted on each grease composition in a manner similar to that of the example 1-1 to evaluate the grease compositions. Results are shown in table 1-1.

TABLE 1-1

| | Example | | | | | Comparative example | | | | |
|---|---|---|---|---|---|---|---|---|---|---|
| | 1-1 | 1-2 | 1-3 | 1-4 | 1-5 | 1-1 | 1-2 | 1-3 | 1-4 | 1-5 |
| Component (parts by weight) | | | | | | | | | | |
| Base grease | | | | | | | | | | |
| Base oil | | | | | | | | | | |
| Alkyldiphenyl ether oil[1] | 32 | 32 | 32 | 15 | 80 | 32 | 32 | 32 | 32 | 32 |
| Synthetic hydrocarbon oil[2] | 48 | 48 | 48 | 63 | — | 48 | 48 | 48 | 48 | 48 |
| Polyol ester oil[3] | — | — | — | — | — | — | — | — | — | — |
| Polymer ester oil[4] | — | — | — | — | — | — | — | — | — | — |
| Mineral oil[5] | — | — | — | — | — | — | — | — | — | — |
| Thickener | | | | | | | | | | |
| Amine: p-toluidine | 4.4 | 4.4 | 4.4 | 10.1 | 9.2 | 4.4 | 4.4 | 4.4 | 4.4 | 4.4 |
| Amine: cyclohexyl amine | — | — | — | — | — | — | — | — | — | — |
| Amine: octyl amine | 5.3 | 5.3 | 5.3 | — | — | 5.3 | 5.3 | 5.3 | 5.3 | 5.3 |
| Diisocyanate: MDI[6] | 10.3 | 10.3 | 10.3 | 11.9 | 10.8 | 10.3 | 10.3 | 10.3 | 10.3 | 10.3 |
| Li-12-hydroxystearate | — | — | — | — | — | — | — | — | — | — |
| (Base oil + Thickener) | (100) | (100) | (100) | (100) | (100) | (100) | (100) | (100) | (100) | (100) |
| Additive | | | | | | | | | | |
| Antioxidant A[7] | — | — | — | — | — | — | — | — | — | — |
| Antioxidant B[8] | 1 | 1 | 1 | 1 | 1 | 1 | 1 | 1 | 1 | — |
| Bismuth trioxide[9] | — | — | — | — | — | — | — | — | — | — |
| Bismuth powder[10] | — | — | — | — | — | — | — | — | — | — |
| Bismuth carbonate[11] | — | — | — | — | — | — | — | — | — | — |
| Sodium bismuthate[12] | — | — | — | — | — | — | — | — | — | — |
| Bismuth naphthenate[13] | 1 | — | — | — | — | — | — | — | — | — |
| Bismuth 2-ethylhexylate[14] | — | 0.1 | 5 | 1 | 1 | — | 0.02 | 20 | — | — |
| Bismuth dimethyldithiocarbamate | — | — | — | — | — | — | — | — | 1 | — |
| Properties | | | | | | | | | | |
| Worked penetration (JIS K2220) | — | — | — | — | — | — | — | — | — | — |
| High-temperature and high-speed test (180° C.), h | — | — | — | — | — | — | — | — | — | — |
| High-temperature and high-speed test (150° C.), h | — | — | — | — | — | — | — | — | — | — |
| Lifetime limited by the occurrence of peeling, h | >300 | >300 | >300 | >300 | >300 | 54 | 89 | 75 | 147 | 43 |

Manufacturing companies, Names of products (kinematic viscosity at 40° C.)
[1] Matsumura Oil Research Corp., MORESCO HILUBE LB100 (97 $mm^2$/s)
[2] Nippon Steel Chemical Co., Ltd., Shin-fluid 801 (47 $mm^2$/s)
[6] Nippon Polyurethane Industry Co., Ltd., Millionate MT
[8] Sumitomo Chemical Co., Ltd, Hindered phenol
[13] Kishida Chemical Co., Ltd., Reagent
[14] Nihon Kagaku Sangyo Co., Ltd., Nikka Octics DINA As shown in table 1-1, because the grease compositions of the examples 1-1 through 1-5 were capable of effectively preventing the occurrence of peculiar peeling with the rolling surface of the bearing turning into white in its texture, the grease compositions showed favorable results in the sudden acceleration/deceleration test 1. In the sudden acceleration/deceleration test 1, the grease compositions of the examples 1-1 through 1-5 all showed not less than 300 hours.

Examples 1-6 through 1-10, 1-13, and 1-14

4,4'-diphenylmethane diisocyanate (MDI) was dissolved in one half of a base oil shown in table 1-2 at a ratio shown in table 1-2. Monoamine was dissolved in the remaining half of the base oil at an equivalent weight two times larger than that of the 4,4'-diphenylmethane diisocyanate. The mixing ratio and the kind of each of the MDI and the monoamine is as shown in table 1-2.

The solution in which the monoamine was dissolved was added to the solution in which the 4,4'-diphenylmethane diisocyanate was dissolved while the solution in which the 4,4'-diphenylmethane diisocyanate was dissolved was being stirred. The stirring continued for 30 minutes at 100 to 120° C. for reaction to form a diurea-based compound in the base oil.

Inorganic bismuth or organic bismuth not containing a sulfur component and the antioxidant were added to the base oil at a mixing ratio shown in table 1-2. The base oil was stirred at 100 to 120° C. for 10 minutes. Thereafter the base oil was cooled and homogenized by the three-roll mill to obtain a grease composition.

In tables 1-2 and 1-3, as alkyldiphenyl ether oil, synthetic hydrocarbon oil, polyol ester oil, and polymer ester oil all used as the base oil, LB100 produced by Matsumura Oil Research Corp., Shin-fluid 601 produced by Nippon Steel Chemical Co., Ltd., Kaolube 268 produced by Kao Corporation, and Ketjenlube produced by Akzo Nobel were used respectively. As mineral oil, paraffin oil having a kinematic viscosity of 30.7 mm$^2$/second (40° C.) was used.

As the antioxidant, alkylated diphenylamine or hindered phenol was used.

A high-temperature and high-speed test 1 and sudden acceleration/deceleration test 2 were conducted on the obtained grease compositions, and the worked penetration was measured in accordance with JIS. The test method and the test condition are shown below. The results are shown in tables 1-2 and 1-3.

<High-Temperature and High-Speed Test 1>

1.8 g of each of grease compositions shown in tables 1-2 and 1-3 was enclosed in a rolling bearing (6204) for use in a motor. Each rolling bearing was rotated at 10000 rpm by setting the temperature of an outer-diameter portion of an outer ring thereof to 180° C. (150° C. in examples 1-11 and 1-12) and applying radial and axial loads of 67 N thereto. A period of time till each rolling bearing was seized was measured.

<Sudden Acceleration/Deceleration Test 2>

2.3 g of each of grease compositions shown in tables 1-2 and 1-3 was enclosed in a rolling bearing (6303). To apply a load to the rolling bearing, having an inner ring which rotates, for supporting the rotating shaft of an alternator which is an example of an electric auxiliary machine was mounted thereon. A sudden acceleration/deceleration test 2 was conducted. The condition of the sudden acceleration/deceleration test 2 was that as the drive condition, a load of 3234 N was applied to a pulley mounted on the tip of the rotational shaft of the alternator, and the rotational speed was set to 0 to 18000 rpm. The time when the generator stopped because peculiar peeling occurred inside the bearing and vibration of the vibration detector exceeded the predetermined value was measured as the lifetime limited by the occurrence of peeling.

Rolling bearings which had not less than 300 hours in the lifetime limited by the occurrence of peeling were evaluated as being excellent in preventing the occurrence of the peeling.

Examples 1-11 and 1-12

Li-12-hydroxy stearate was supplied to the base oil shown in table 1-2. While the base oil was being stirred, the base oil was heated at 200° C. to dissolve the Li-12-hydroxy stearate therein. The mixing ratio of the Li-12-hydroxy stearate in each of the examples 1-11 and 1-12 is as shown in table 1-2. After the base oil was cooled, inorganic bismuth or organic bismuth not containing a sulfur component and an antioxidant were added to the base oil at mixing ratios shown in table 1-2. Thereafter the base oil was homogenized by the three-roll mill to obtain a grease composition of each example. Similarly to the example 1-6, the high-temperature and high-speed test 1 and the sudden acceleration/deceleration test 2 were conducted on the obtained grease compositions. In consideration of the heat resistance of lithium soap grease, the high-temperature and high-speed test 1 was conducted at 150° C.

Comparative Examples 1-6 Through 1-13

Similarly to the method of the example 1-6 and at a mixing ratio shown in table 1-3, base grease was prepared by selecting a thickener and a base oil and in addition, an additive was added to the base grease to obtain a grease composition of each comparative example. A test was conducted on each grease composition in a manner similar to that of the example 1-6 to evaluate the grease compositions. Results are shown in table 1-3.

TABLE 1-2

| | Example | | | | | | | | |
|---|---|---|---|---|---|---|---|---|---|
| | 1-6 | 1-7 | 1-8 | 1-9 | 1-10 | 1-11 | 1-12 | 1-13 | 1-14 |
| Component (parts by weight) | | | | | | | | | |
| Base grease | | | | | | | | | |
| Base oil | | | | | | | | | |
| Alkyldiphenyl ether oil[1] | — | — | — | — | — | — | — | 48 | 48 |
| Synthetic hydrocarbon oil[2] | — | — | 61.4 | 61.4 | 60 | — | — | 32 | 32 |
| Polyol ester oil[3] | — | 85 | — | — | 25 | 90 | — | — | — |
| Polymer ester oil[4] | — | — | 25.6 | 25.6 | — | — | — | — | — |
| Mineral oil[5] | 87 | — | — | — | — | — | 90 | — | — |

TABLE 1-2-continued

|  | Example | | | | | | | | |
|---|---|---|---|---|---|---|---|---|---|
|  | 1-6 | 1-7 | 1-8 | 1-9 | 1-10 | 1-11 | 1-12 | 1-13 | 1-14 |
| Thickener | | | | | | | | | |
| Amine: p-toluidine | — | — | — | — | — | — | — | 4.4 | 4.4 |
| Amine: cyclohexyl amine | — | 6.6 | — | — | 6.6 | — | — | — | — |
| Amine: octyl amine | 6.6 | — | 6.6 | 6.6 | — | — | — | 5.3 | 5.3 |
| Diisocyanate: MDI[6] | 6.4 | 8.4 | 6.4 | 6.4 | 8.4 | — | — | 10.3 | 10.3 |
| Li-12-hydroxystearate | — | — | — | — | — | 10 | 10 | — | — |
| (Base oil + Thickener) | (100) | (100) | (100) | (100) | (100) | (100) | (100) | (100) | (100) |
| Additive | | | | | | | | | |
| Antioxidant A[7] | 2 | 2 | 2 | 2 | 2 | 2 | 2 | — | — |
| Antioxidant B[8] | — | — | — | — | — | — | — | 1 | 1 |
| Bismuth trioxide[9] | 0.5 | — | — | — | — | — | — | — | — |
| Bismuth powder[10] | — | 0.1 | — | — | — | 1 | — | — | — |
| Bismuth carbonate[11] | — | — | — | — | — | — | — | 1 | — |
| Sodium bismuthate[12] | — | — | 1 | — | — | — | — | — | — |
| Bismuth naphthenate[13] | — | — | — | 1 | — | — | — | — | — |
| Bismuth 2-ethylhexylate[14] | — | — | — | — | 1 | — | 5 | — | 5 |
| Bismuth dimethyldithiocarbamate | — | — | — | — | — | — | — | — | — |
| Properties | | | | | | | | | |
| Worked penetration (JIS K2220) | — | — | — | — | — | — | — | — | — |
| High-temperature and high-speed test (180° C.), h | 310 | 440 | 520 | 470 | 630 | — | — | 590 | 680 |
| High-temperature and high-speed test (150° C.), h | — | — | — | — | — | 1370 | 370 | — | — |
| Lifetime limited by the occurrence of peeling, h | >300 | >300 | >300 | >300 | >300 | >300 | >300 | >300 | >300 |

Manufacturing companies, Names of products (kinematic viscosity at 40° C.)
[1] Matsumura Oil Research Corp., Moresco Hilube LB100(97 mm$^2$/s)
[2] Nippon Steel Chemical Co., Ltd., Shin-fluid 801 (47 mm$^2$/s)
[3] Kao Corporation, KAOLUBE 268 (33 mm$^2$/s)
[4] Akzo Nobel, KETJENLUBE 115 (112 mm$^2$/s)
[5] Paraffinic mineral oil (30.7 mm$^2$/s)
[6] Nippon Polyurethane Industry Co., Ltd., Millionate MT
[7] Alkylated diphenylamine
[8] Sumitomo Chemical Co., Ltd., Hindered phenol
[9] Kojundo Chemical Laboratory Co., Ltd., Reagent
[10] Wako Pure Chemical Industries, Ltd., Reagent
[11] Kanto Chemical Co., Inc., Reagent
[12] Kanto Chemical Co., Inc., Reagent
[13] Kishida Chemical Co., Ltd., Reagent
[14] Nihon Kagaku Sangyo Co., Ltd., Nikka Octics DINA

TABLE 1-3

|  | Comparative example | | | | | | | |
|---|---|---|---|---|---|---|---|---|
|  | 1-6 | 1-7 | 1-8 | 1-9 | 1-10 | 1-11 | 1-12 | 1-13 |
| Component (parts by weight) | | | | | | | | |
| Base grease | | | | | | | | |
| Base oil | | | | | | | | |
| Alkyldiphenyl ether oil[1] | — | — | — | — | 48 | 48 | 48 | 48 |
| Synthetic hydrocarbon oil[2] | — | 61.4 | 60 | — | 32 | 32 | 32 | 32 |
| Polyol ester oil[3] | — | — | 25 | — | — | — | — | — |
| Polymer ester oil[4] | — | 25.6 | — | — | — | — | — | — |
| Mineral oil[5] | 90 | — | — | 87 | — | — | — | — |
| Thickener | | | | | | | | |
| Amine: p-toluidine | — | — | — | — | 4.4 | 4.4 | 4.4 | 4.4 |
| Amine: cyclohexyl amine | — | — | 6.6 | — | — | — | — | — |
| Amine: octyl amine | — | 6.6 | — | 6.6 | 5.3 | 5.3 | 5.3 | 5.3 |
| Diisocyanate: MDI[6] | — | 6.4 | 8.4 | 6.4 | 10.3 | 10.3 | 10.3 | 10.3 |
| Li-12-hydroxystearate | 10 | — | — | — | — | — | — | — |
| (Base oil + Thickener) | (100) | (100) | (100) | (100) | (100) | (100) | (100) | (100) |
| Additive | | | | | | | | |
| Antioxidant A[7] | 2 | 2 | 2 | 2 | — | — | — | — |
| Antioxidant B[8] | — | — | — | — | — | 1 | 1 | 1 |
| Bismuth trioxide[9] | — | — | — | — | — | — | — | 15 |
| Bismuth powder[10] | — | — | — | — | — | — | — | — |

TABLE 1-3-continued

|  | Comparative example | | | | | | | |
|---|---|---|---|---|---|---|---|---|
|  | 1-6 | 1-7 | 1-8 | 1-9 | 1-10 | 1-11 | 1-12 | 1-13 |
| Bismuth carbonate[11] | — | — | — | — | — | — | — | — |
| Sodium bismuthate[12] | — | — | — | — | — | — | — | — |
| Bismuth naphthenate[13] | — | — | — | — | — | — | — | — |
| Bismuth 2-ethylhexylate[14] | — | — | — | — | — | — | 0.02 | — |
| Bismuth dimethyldithiocarbamate | — | — | — | — | — | 1 | — | — |
| Properties | | | | | | | | |
| Worked penetration (JIS K2220) | — | — | — | — | — | — | — | — |
| High-temperature and high-speed test (180° C.), h | — | 410 | 330 | 180 | 290 | 450 | 470 | 610 |
| High-temperature and high-speed test (150° C.), h | 70 | — | — | — | — | — | — | — |
| Lifetime limited by the occurrence of peeling, h | 31 | 24 | 35 | 55 | 43 | 147 | 89 | 99 |

Manufacturing companies, Names of products (kinematic viscosity at 40° C.)
[1]Matsumura Oil Research Corp., Moresco Hilube LB100(97 mm$^2$/s)
[2]Nippon Steel Chemical Co., Ltd., Shin-fluid 801 (47 mm$^2$/s)
[3]Kao Corporation, KAOLUBE 268 (33 mm$^2$/s)
[4]Akzo Nobel, KETJENLUBE 115 (112 mm$^2$/s)
[5]Paraffinic mineral oil (30.7 mm$^2$/s)
[6]Nippon Polyurethane Industry Co., Ltd., Millionate MT
[7]Alkylated diphenylamine
[8]Sumitomo Chemical Co., Ltd., Hindered phenol
[9]Kojundo Chemical Laboratory Co., Ltd., Reagent
[14]Nihon Kagaku Sangyo Co., Ltd., Nikka Octics DINA As shown in table 1-2, the lifetime limited by the occurrence of peeling of the examples 1-6 through 1-14 was not less than 300 hours. It was found that the rolling bearing using the grease composition of the examples 1-6 through 1-14 could effectively prevent the peculiar peeling from occurring with the rolling surface of the bearing turning into white in its texture.

Examples 1-15 Through 1-27

The 4,4'-diphenylmethane diisocyanate (commercial name: Millionate MT, hereinafter referred to as MDI produced by Nippon Polyurethane Industry Co., Ltd.) was dissolved in one half of a base oil shown in table 1-4 at a ratio shown in table 1-4. Monoamine was dissolved in the remaining half of the base oil at an equivalent weight two times larger than that of the MDI. The mixing ratio and the kind of each of the MDI and the monoamine is as shown in table 1-4.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

The bismuth-based additive and the antioxidant were added to the base oil at a mixing ratio shown in table 1-4. The base oil was stirred at 100 to 120° C. for 10 minutes. Thereafter the base oil was cooled and homogenized by a three-roll mill to obtain a grease composition.

In table 1-4, as synthetic hydrocarbon oil and alkyldiphenyl ether oil used as the base oil, Shin-fluid 801 (commercial name), produced by Nippon Steel Chemical Co., Ltd., which has a kinematic viscosity of 47 mm$^2$/second at 40° C. and Moresco Hilube LB100 (commercial name), produced by Matsumura Oil Research Corp., which has a kinematic viscosity of 97 mm$^2$/second at 40° C. were used respectively. As the antioxidant, hindered phenol produced by Sumitomo Chemical Co., Ltd. was used.

A sudden acceleration/deceleration test 3 was conducted on the obtained grease compositions. The test method and the test condition are shown below. The results are shown in table 1-4.

<Sudden Acceleration/Deceleration Test 3>

The sudden acceleration/deceleration test 3 was conducted on a rolling bearing, having an inner ring which rotates, for supporting the rotating shaft of an alternator which is an example of an electric auxiliary machine. The condition of the sudden acceleration/deceleration test 3 was that as the drive condition, a load of 3234 N was applied to a pulley mounted on the tip of the rotational shaft of the alternator, and the rotational speed was set to 0 to 18000 rpm. The time when the generator stopped because peculiar peeling occurred inside the bearing and vibration of the vibration detector exceeded the predetermined value was measured.

Comparative Examples 1-14 Through 1-20

Similarly to the method of the example 1-15 and at a mixing ratio shown in table 1-5, base grease was prepared by selecting a thickener and a base oil and in addition, an additive was added to the base grease to obtain a grease composition of each comparative example. A test was conducted on each grease composition in a manner similar to that of the example 1-15 to evaluate the grease compositions. Results are shown in table 1-5.

TABLE 1-4

| | Example | | | | | | |
|---|---|---|---|---|---|---|---|
| | 1-15 | 1-16 | 1-17 | 1-18 | 1-19 | 1-20 | 1-21 |
| Component (parts by weight) | | | | | | | |
| Base grease | | | | | | | |
| Base oil | | | | | | | |
| Alkyldiphenyl ether oil[1] | 32 | 32 | 32 | 32 | 15 | 80 | 32 |
| Synthetic hydrocarbon oil[2] | 48 | 48 | 48 | 48 | 63 | — | 48 |
| Polyol ester oil[3] | — | — | — | — | — | — | — |
| Polymer ester oil[4] | — | — | — | — | — | — | — |
| Mineral oil[5] | — | — | — | — | — | — | — |
| Thickener | | | | | | | |
| Amine: p-toluidine | 4.4 | 4.4 | 4.4 | 4.4 | 10.1 | 9.2 | 4.4 |
| Amine: cyclohexyl amine | — | — | — | — | — | — | — |
| Amine: octyl amine | 5.3 | 5.3 | 5.3 | 5.3 | — | — | 5.3 |
| Diisocyanate: MDI[6] | 10.3 | 10.3 | 10.3 | 10.3 | 11.9 | 10.8 | 10.3 |
| Li-12-hydroxystearate | — | — | — | — | — | — | — |
| (Base oil + Thickener) | (100) | (100) | (100) | (100) | (100) | (100) | (100) |
| Additive | | | | | | | |
| Antioxidant A[7] | — | — | — | — | — | — | — |
| Antioxidant B[8] | 1 | 1 | 1 | 1 | 1 | 1 | 1 |
| Bismuth trioxide[9] | 1 | — | — | — | 1 | 1 | 0.1 |
| Bismuth powder[10] | — | 1 | — | — | — | — | — |
| Bismuth carbonate[11] | — | — | 1 | — | — | — | — |
| Sodium bismuthate[12] | — | — | — | 1 | — | — | — |
| Bismuth naphthenate[13] | — | — | — | — | — | — | — |
| Bismuth 2-ethylhexylate[14] | — | — | — | — | 1 | — | — |
| Bismuth dimethyldithiocarbamate | — | — | — | — | — | — | — |
| Properties | | | | | | | |
| Worked penetration (JIS K2220) | — | — | — | — | — | — | — |
| High-temperature and high-speed test (180° C.), h | — | — | — | — | — | — | — |
| High-temperature and high-speed test (150° C.), h | — | — | — | — | — | — | — |
| Lifetime limited by the occurrence of peeling, h | >300 | >300 | >300 | >300 | >300 | >300 | >300 |

| | Example | | | | | |
|---|---|---|---|---|---|---|
| | 1-22 | 1-23 | 1-24 | 1-25 | 1-26 | 1-27 |
| Component (parts by weight) | | | | | | |
| Base grease | | | | | | |
| Base oil | | | | | | |
| Alkyldiphenyl ether oil[1] | 32 | 32 | 32 | 32 | 15 | 80 |
| Synthetic hydrocarbon oil[2] | 48 | 48 | 48 | 48 | 63 | — |
| Polyol ester oil[3] | — | — | — | — | — | — |
| Polymer ester oil[4] | — | — | — | — | — | — |
| Mineral oil[5] | — | — | — | — | — | — |
| Thickener | | | | | | |
| Amine: p-toluidine | 4.4 | 4.4 | 4.4 | 4.4 | 10.1 | 9.2 |
| Amine: cyclohexyl amine | — | — | — | — | — | — |
| Amine: octyl amine | 5.3 | 5.3 | 5.3 | 5.3 | — | — |
| Diisocyanate: MDI[6] | 10.3 | 10.3 | 10.3 | 10.3 | 11.9 | 10.8 |
| Li-12-hydroxystearate | — | — | — | — | — | — |
| (Base oil + Thickener) | (100) | (100) | (100) | (100) | (100) | (100) |
| Additive | | | | | | |
| Antioxidant A[7] | — | — | — | — | — | — |
| Antioxidant B[8] | 1 | — | — | — | — | — |
| Bismuth trioxide[9] | 5 | — | — | — | — | — |
| Bismuth powder[10] | — | — | — | — | — | — |
| Bismuth carbonate[11] | — | — | — | — | — | — |
| Sodium bismuthate[12] | — | — | — | — | — | — |
| Bismuth naphthenate[13] | — | 1 | — | — | — | — |
| Bismuth 2-ethylhexylate[14] | — | — | 0.1 | 5 | 1 | 1 |
| Bismuth dimethyldithiocarbamate | — | — | — | — | — | — |
| Properties | | | | | | |
| Worked penetration (JIS K2220) | — | — | — | — | — | — |
| High-temperature and high-speed test (180° C.), h | — | — | — | — | — | — |

TABLE 1-4-continued

| | | | | | | |
|---|---|---|---|---|---|---|
| High-temperature and high-speed test (150° C.), h | — | — | — | — | — | — |
| Lifetime limited by the occurrence of peeling, h | >300 | >300 | >300 | >300 | >300 | >300 |

Manufacturing companies, Names of products (kinematic viscosity at 40° C.)
[1])Matsumura Oil Research Corp., Moresco Hilube LB100(97 mm$^2$/s)
[2])Nippon Steel Chemical Co., Ltd., Shin-fluid 801 (47 mm$^2$/s)
[6])Nippon Polyurethane Industry Co., Ltd., Millionate MT
[8])Sumitomo Chemical Co., Ltd., Hindered phenol
[9])Kojundo Chemical Laboratory Co., Ltd., Reagent
[10])Wako Pure Chemical Industries, Ltd., Reagent
[11])Kanto Chemical Co., Inc., Reagent
[12])Kanto Chemical Co., Inc., Reagent
[13])Kishida Chemical Co., Ltd., Reagent
[14])Nihon Kagaku Sangyo Co., Ltd., Nikka Octics DINA

TABLE 1-5

| | Comparative example | | | | | | |
|---|---|---|---|---|---|---|---|
| | 1-14 | 1-15 | 1-16 | 1-17 | 1-18 | 1-19 | 1-20 |
| Component (parts by weight) | | | | | | | |
| Base grease | | | | | | | |
| Base oil | | | | | | | |
| Alkyldiphenyl ether oil[1]) | 32 | 32 | 32 | 32 | 32 | 32 | 32 |
| Synthetic hydrocarbon oil[2]) | 48 | 48 | 48 | 48 | 48 | 48 | 48 |
| Polyol ester oil[3]) | — | — | — | — | — | — | — |
| Polymer ester oil[4]) | — | — | — | — | — | — | — |
| Mineral oil[5]) | — | — | — | — | — | — | — |
| Thickener | | | | | | | |
| Amine: p-toluidine | 4.4 | 4.4 | 4.4 | 4.4 | 4.4 | 4.4 | 4.4 |
| Amine: cyclohexyl amine | — | — | — | — | — | — | — |
| Amine: octyl amine | 5.3 | 5.3 | 5.3 | 5.3 | 5.3 | 5.3 | 5.3 |
| Diisocyanate: MDI[6]) | 10.3 | 10.3 | 10.3 | 10.3 | 10.3 | 10.3 | 10.3 |
| Li-12-hydroxystearate | — | — | — | — | — | — | — |
| (Base oil + Thickener) | (100) | (100) | (100) | (100) | (100) | (100) | (100) |
| Additive | | | | | | | |
| Antioxidant A[7]) | — | — | — | — | — | — | — |
| Antioxidant B[8]) | 1 | 1 | 1 | 1 | — | 1 | 1 |
| Bismuth trioxide[9]) | — | — | — | — | — | 0.02 | 15 |
| Bismuth powder[10]) | — | — | — | — | — | — | — |
| Bismuth carbonate[11]) | — | — | — | — | — | — | — |
| Sodium bismuthate[12]) | — | — | — | — | — | — | — |
| Bismuth naphthenate[13]) | — | — | — | — | — | — | — |
| Bismuth 2-ethylhexylate[14]) | — | 0.02 | 20 | — | — | — | — |
| Bismuth dimethyldithiocarbamate | — | — | — | 1 | — | — | — |
| Properties | | | | | | | |
| Worked penetration (JIS K2220) | — | — | — | — | — | — | — |
| High-temperature and high-speed test (180° C.), h | — | — | — | — | — | — | — |
| High-temperature and high-speed test (150° C.), h | — | — | — | — | — | — | — |
| Lifetime limited by the occurrence of peeling, h | 54 | 89 | 75 | 147 | 43 | 161 | 99 |

Manufacturing companies, Names of products (kinematic viscosity at 40° C.)
[1])Matsumura Oil Research Corp., Moresco Hilube LB100(97 mm$^2$/s)
[2])Nippon Steel Chemical Co., Ltd., Shin-fluid 801 (47 mm$^2$/s)
[6])Nippon Polyurethane Industry Co., Ltd., Millionate MT
[8])Sumitomo Chemical Co., Ltd., Hindered phenol
[9])Kojundo Chemical Laboratory Co., Ltd., Reagent
[14])Nihon Kagaku Sangyo Co., Ltd., Nikka Octics DINA As shown in tables 1-4 and 1-5, because the grease compositions of the examples 1-15 through 1-27 were capable of effectively preventing the occurrence of the peculiar peeling with the rolling surface of the bearing turning into white in its texture, the grease compositions showed favorable results in the sudden acceleration/deceleration test 3. In the sudden acceleration/deceleration test 3, the grease compositions of the examples 1-15 through 1-27 all showed not less than 300 hours.

Examples 1-28 Through 1-39 and Example 1-42

4,4'-diphenylmethane diisocyanate (Millionate MT produced by Nippon Polyurethane Industry Co., Ltd. Hereinafter referred to as MDI) was dissolved in one half of base oil shown in table 1-6 at a ratio shown in table 1-6. Monoamine was dissolved in the remaining half of the base oil at an equivalent weight two times larger than that of the MDI. The mixing ratio and the kind of each of the MDI and the monoamine is as shown in table 1-6.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

Bismuth-based additive and the antioxidant were added to the base oil at a mixing ratio shown in table 1-6. The base oil was stirred at 100 to 120° C. for 10 minutes. Thereafter the base oil was cooled and homogenized by the three-roll mill to obtain a grease composition.

In table 1-6, as alkyldiphenyl ether oil, synthetic hydrocarbon oil, and polyol ester oil all used as the base oil, Moresco Hilube LB100 produced by Matsumura Oil Research Corp., Shin-fluid 601 produced by Nippon Steel Chemical Co., Ltd., and Kaolube 268 produced by Kao Corporation were used respectively. As mineral oil, paraffin oil having a kinematic viscosity of 30.7 mm$^2$/second (40° C.) was used.

As the antioxidant, alkylated diphenylamine was used.

The worked penetration of each of the obtained grease compositions was measured in accordance with JIS K 2220. The high-temperature and high-speed test 2 and a sudden acceleration/deceleration test 4 were conducted on them. The test method and the test condition of the high-temperature and high-speed test 2 and the sudden acceleration/deceleration test 4 are shown below. The results are shown in table 1-6.

<High-Temperature and High-Speed Test 2>

1.8 g of each of grease compositions shown in tables 1-6 and 1-7 was enclosed in each rolling bearing (6204) for use in a robot. Each rolling bearing was rotated at 10000 rpm by setting the temperature of the outer-diameter portion of the outer ring thereof to 180° C. and applying radial and axial loads of 67 N thereto. A period of time till each rolling bearing was seized was measured.

<Sudden Acceleration/Deceleration Test 4>

2.3 g of each of grease compositions shown in tables 1-6 and 1-7 was enclosed in a rolling bearing (6303) for use in a robot. To apply a load to the rolling bearing, a sudden acceleration/deceleration test 4 was conducted on a rolling bearing, having an inner ring which rotates, for supporting the rotating shaft of an alternator which is an example of an electric auxiliary machine was mounted thereon. The condition of the sudden acceleration/deceleration test 4 was that as the drive condition, a load of 3234 N was applied to a pulley mounted on the tip of the rotational shaft of the alternator, and the rotational speed was set to 0 to 18000 rpm. The time when the generator stopped because peculiar peeling occurred inside the bearing and vibration of the vibration detector exceeded the predetermined value was measured. In the test, 1 part by weight of pure water was mixed with 100 parts by weight of the grease composition. The test was conducted for 100 hours.

Examples 1-40 and 1-41

The Li-12-hydroxy stearate was supplied to the base oil shown in table 1-6. While the base oil was being stirred, the base oil was heated at 200° C. to dissolve the Li-12-hydroxy stearate therein. The mixing ratio of the Li-12-hydroxy stearate in each of the examples 1-40 and 1-41 is as shown in table 1-6. After the base oil was cooled, the bismuth-based additive and the antioxidant were added to the base oil at mixing ratios shown in table 1-6. Thereafter the base oil was homogenized by the three-roll mill to obtain a grease composition of each example. Similarly to the example 1-28, the high-temperature and high-speed test 2 and the sudden acceleration/deceleration test 4 were conducted on the obtained grease compositions. In consideration of the heat resistance of the lithium soap grease, the high-temperature and high-speed test 2 was conducted at 150° C.

Comparative Examples 1-21 Through 1-25

Similarly to the method of the example 1-28 and at a mixing ratio shown in table 1-7, base grease was prepared by selecting a thickener and a base oil and in addition, an additive was added to the base grease to obtain a grease composition of each comparative example. A test was conducted on each grease composition in a manner similar to that of the example 1-28 to evaluate the grease compositions. Results are shown in table 1-7.

TABLE 1-6

| | Example | | | | | | | |
|---|---|---|---|---|---|---|---|---|
| | 1-28 | 1-29 | 1-30 | 1-31 | 1-32 | 1-33 | 1-34 | 1-35 |
| Component (parts by weight) | | | | | | | | |
| Base grease | | | | | | | | |
| Base oil | | | | | | | | |
| Alkyldiphenyl ether oil[1] | 80 | 80 | 80 | 80 | 60 | 60 | — | — |
| Synthetic hydrocarbon oil[2] | — | — | — | — | 20 | — | — | — |
| Polyol ester oil[3] | — | — | — | — | — | 20 | — | 85 |
| Polymer ester oil[4] | — | — | — | — | — | — | — | — |
| Mineral oil[5] | — | — | — | — | — | — | 87 | — |
| Thickener | | | | | | | | |
| Amine: p-toluidine | 9.3 | 9.3 | 9.3 | 9.3 | 9.3 | 9.3 | — | — |
| Amine: cyclohexyl amine | — | — | — | — | — | — | — | 6.6 |
| Amine: octyl amine | — | — | — | — | — | — | 6.6 | — |
| Diisocyanate: MDI[6] | 10.7 | 10.7 | 10.7 | 10.7 | 10.7 | 10.7 | 6.4 | 8.4 |
| Li-12-hydroxystearate | — | — | — | — | — | — | — | — |
| (Base oil + Thickener) | (100) | (100) | (100) | (100) | (100) | (100) | (100) | (100) |
| Additive | | | | | | | | |
| Antioxidant A[7] | 2 | 2 | 2 | 2 | 2 | 2 | 2 | 2 |
| Antioxidant B[8] | — | — | — | — | — | — | — | — |
| Bismuth trioxide[9] | 1 | — | — | — | 1 | 1 | 1 | — |
| Bismuth powder[10] | — | 1 | — | — | — | — | — | — |
| Bismuth carbonate[11] | — | — | 1 | — | — | — | — | — |

TABLE 1-6-continued

| | | | | | | | | |
|---|---|---|---|---|---|---|---|---|
| Sodium bismuthate[12] | — | — | — | 1 | — | — | — | — |
| Bismuth naphthenate[13] | — | — | — | — | — | — | — | — |
| Bismuth 2-ethylhexylate[14] | — | — | — | — | — | — | — | 1 |
| Bismuth dimethyldithiocarbamate | — | — | — | — | — | — | — | — |
| Properties | | | | | | | | |
| Worked penetration (JIS K2220) | 280 | 290 | 290 | 285 | 285 | 280 | 270 | 285 |
| High-temperature and high-speed test (180° C.), h | 860 | 800 | 680 | 650 | 780 | 740 | 310 | 450 |
| High-temperature and high-speed test (150° C.), h | — | — | — | — | — | — | — | — |
| Lifetime limited by the occurrence of peeling, h | >100 | >100 | >100 | >100 | >100 | >100 | >100 | >100 |

| | Example | | | | | | |
|---|---|---|---|---|---|---|---|
| | 1-36 | 1-37 | 1-38 | 1-39 | 1-40 | 1-41 | 1-42 |
| Component (parts by weight) | | | | | | | |
| Base grease | | | | | | | |
| Base oil | | | | | | | |
| Alkyldiphenyl ether oil[1] | 87 | — | 80 | 80 | — | — | 61.4 |
| Synthetic hydrocarbon oil[2] | — | 87 | — | — | — | — | — |
| Polyol ester oil[3] | — | — | — | — | 90 | — | 25.6 |
| Polymer ester oil[4] | — | — | — | — | — | — | — |
| Mineral oil[5] | — | — | — | — | — | 90 | — |
| Thickener | | | | | | | |
| Amine: p-toluidine | — | — | 9.3 | 9.3 | — | — | — |
| Amine: cyclohexyl amine | — | — | — | — | — | — | — |
| Amine: octyl amine | 6.6 | 6.6 | — | — | — | — | 6.6 |
| Diisocyanate: MDI[6] | 6.4 | 6.4 | 10.7 | 10.7 | — | — | 6.4 |
| Li-12-hydroxystearate | — | — | — | — | 10 | 10 | — |
| (Base oil + Thickener) | (100) | (100) | (100) | (100) | (100) | (100) | (100) |
| Additive | | | | | | | |
| Antioxidant A[7] | 2 | 2 | 2 | 2 | 2 | 2 | 2 |
| Antioxidant B[8] | — | — | — | — | — | — | — |
| Bismuth trioxide[9] | — | — | 0.1 | 5 | 1 | 1 | — |
| Bismuth powder[10] | — | — | — | — | — | — | — |
| Bismuth carbonate[11] | — | — | — | — | — | — | — |
| Sodium bismuthate[12] | — | — | — | — | — | — | — |
| Bismuth naphthenate[13] | — | — | — | — | — | — | 1 |
| Bismuth 2-ethylhexylate[14] | 1 | 1 | — | — | — | — | — |
| Bismuth dimethyldithiocarbamate | — | — | — | — | — | — | — |
| Properties | | | | | | | |
| Worked penetration (JIS K2220) | 280 | 280 | 290 | 290 | 285 | 285 | 285 |
| High-temperature and high-speed test (180° C.), h | 630 | 580 | 700 | 580 | — | — | 470 |
| High-temperature and high-speed test (150° C.), h | — | — | — | — | 890 | 210 | — |
| Lifetime limited by the occurrence of peeling, h | >100 | >100 | >100 | >100 | >100 | >100 | >100 |

Manufacturing companies, Names of products (kinematic viscosity at 40° C.)
[1] Matsumura Oil Research Corp., Moresco Hilube LB100 (97 mm²/s)
[2] Nippon Steel Chemical Co., Ltd., Shin-fluid 801 (47 mm²/s)
[3] Kao Corporation, KAOLUBE 268 (33 mm²/s)
[5] Paraffinic mineral oil (30.7 mm²/s)
[6] Nippon Polyurethane Industry Co., Ltd., Millionate MT
[7] Alkylated diphenylamine
[9] Kojundo Chemical Laboratory Co., Ltd., Reagent
[10] Wako Pure Chemical Industries, Ltd., Reagent
[11] Kanto Chemical Co., Inc., Reagent
[12] Kanto Chemical Co., Inc., Reagent
[14] Nihon Kagaku Sangyo Co., Ltd., Nikka Octics DINA

TABLE 1-7

|  | Comparative example | | | | |
| --- | --- | --- | --- | --- | --- |
|  | 1-21 | 1-22 | 1-23 | 1-24 | 1-25 |
| Component (parts by weight) | | | | | |
| Base grease | | | | | |
| Base oil | | | | | |
| Alkyldiphenyl ether oil[1)] | 60 | — | — | — | — |
| Synthetic hydrocarbon oil[2)] | 20 | — | 87 | — | — |
| Polyol ester oil[3)] | — | 85 | — | — | 90 |
| Polymer ester oil[4)] | — | — | — | — | — |
| Mineral oil[5)] | — | — | — | 87 | — |
| Thickener | | | | | |
| Amine: p-toluidine | 9.3 | — | — | — | — |
| Amine: cyclohexyl amine | — | 6.6 | — | — | — |
| Amine: octyl amine | — | — | 6.6 | 6.6 | — |
| Diisocyanate: MDI[6)] | 10.7 | 8.4 | 6.4 | 6.4 | — |
| Li-12-hydroxystearate | — | — | — | — | 10 |
| (Base oil + Thickener) | (100) | (100) | (100) | (100) | (100) |
| Additive | | | | | |
| Antioxidant A[7)] | 2 | 2 | 2 | 2 | 2 |
| Antioxidant B[8)] | — | — | — | — | — |
| Bismuth trioxide[9)] | — | — | — | — | — |
| Bismuth powder[10)] | — | — | — | — | — |
| Bismuth carbonate[11)] | — | — | — | — | — |
| Sodium bismuthate[12)] | — | — | — | — | — |
| Bismuth naphthenate[13)] | — | — | — | — | — |
| Bismuth 2-ethylhexylate[14)] | — | 0.02 | 20 | — | — |
| Bismuth dimethyldithiocarbamate | — | — | — | 1 | — |
| Properties | | | | | |
| Worked penetration (JIS K2220) | 290 | 280 | 295 | 295 | 285 |
| High-temperature and high-speed test (180° C.), h | 420 | 230 | 900 | 180 | — |
| High-temperature and high-speed test (150° C.), h | — | — | — | — | 90 |
| Lifetime limited by the occurrence of peeling, h | 53 | 21 | 37 | 41 | 42 |

Manufacturing companies, Names of products (kinematic viscosity at 40° C.)
[1)]Matsumura Oil Research Corp., Moresco Hilube LB100(97 mm$^2$/s)
[2)]Nippon Steel Chemical Co., Ltd., Shin-fluid 801 (47 mm$^2$/s)
[3)]Kao Corporation, KAOLUBE 268 (33 mm$^2$/s)
[5)]Paraffinic mineral oil (30.7 mm$^2$/s)
[6)]Nippon Polyurethane Industry Co., Ltd., Millionate MT
[7)]Alkylated diphenylamine
[14)]Nihon Kagaku Sangyo Co., Ltd., Nikka Octics DINA As shown in tables 1-6 and 1-7, because the grease compositions of the examples 1-28 through 1-42 were capable of effectively preventing peculiar peeling from occurring with the rolling surface of the rolling bearings for use in a robot turning into white in its texture, the grease compositions showed favorable results in the high-temperature and high-speed test 3 and the sudden acceleration/deceleration test 4. In the sudden acceleration/deceleration test 1, the grease compositions of the examples 1-28 through 1-42 all showed not less than 100 hours.

Examples 2-1 through 2-4

4,4'-diphenylmethane diisocyanate (commercial name: Millionate MT, hereinafter referred to as MDI produced by Nippon Polyurethane Industry Co., Ltd.) was dissolved in one half of a base oil shown in table 2-1 at a ratio shown in table 2-1. Monoamine was dissolved in the remaining half of the base oil at an equivalent weight two times larger than that of the MDI. The mixing ratio and the kind of each of the MDI and the monoamine is as shown in table 2-1.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

Magnesium-based additive and the antioxidant were added to the base oil at a mixing ratio shown in table 2-1. The base oil was stirred at 100 to 120° C. for 10 minutes. Thereafter the base oil was cooled and homogenized by a three-roll mill to obtain a grease composition.

In table 2-1, as synthetic hydrocarbon oil and alkyldiphenyl ether oil used as the base oil, Shin-fluid 801 (commercial name), produced by Nippon Steel Chemical Co., Ltd., which has a kinematic viscosity of 47 mm$^2$/second at 40° C. and Moresco Hilube LB100 (commercial name), produced by Matsumura Oil Research Corp., which has a kinematic viscosity of 97 mm$^2$/second at 40° C. were used respectively. As the antioxidant, hindered phenol produced by Sumitomo Chemical Co., Ltd. was used.

A sudden acceleration/deceleration test 5 was conducted on the obtained grease compositions. The test method and the test condition are shown below. The results are shown in table 2-1.

<Sudden Acceleration/Deceleration Test 5>

The sudden acceleration/deceleration test 5 was conducted on a rolling bearing, having an inner ring which rotates, for supporting the rotating shaft of an alternator which is an example of an electric auxiliary machine. The condition of the sudden acceleration/deceleration test 5 was that as the drive condition, a load of 3234 N was applied to a pulley mounted on the tip of the rotational shaft of the alternator, and the rotational speed was set to 0 to 18000 rpm. The time when the generator stopped because peculiar peeling occurred inside the bearing and vibration of the vibration detector exceeded a predetermined value was measured.

Comparative Examples 2-1 through 2-4

Similarly to the method of the example 2-1 and at a mixing ratio shown in table 2-1, base grease was prepared by selecting a thickener and a base oil and in addition, an additive was added to the base grease to obtain a grease composition of each comparative example. A test was conducted on each grease composition in a manner similar to that of the example 2-1 to evaluate the grease compositions. Results are shown in table 2-1.

Examples 2-5 through 2-8

4,4'-diphenylmethane diisocyanate (commercial name: Millionate MT, hereinafter referred to as MDI produced by Nippon Polyurethane Industry Co., Ltd.) was dissolved in one half of a base oil shown in table 2-2 at a ratio shown in table 2-2. Monoamine was dissolved in the remaining half of the base oil at an equivalent weight two times larger than that of the MDI. The mixing ratio and the kind of each of the MDI and the monoamine is as shown in table 2-2.

The solution in which the monoamine was dissolved was added to the solution in which the MDI was dissolved, while the solution in which the MDI was dissolved was being stirred. The stirring continued for 30 minutes at 100 to 120° C. for reaction to form a diurea-based compound in the base oil.

The magnesium-based additive and the antioxidant were added to the base oil at a mixing ratio shown in table 2-2. The base oil was stirred at 100 to 120° C. for 10 minutes. Thereafter the base oil was cooled and homogenized by a three-roll mill to obtain a grease composition.

TABLE 2-1

|  | Example | | | | Comparative example | | | |
| --- | --- | --- | --- | --- | --- | --- | --- | --- |
|  | 2-1 | 2-2 | 2-3 | 2-4 | 2-1 | 2-2 | 2-3 | 2-4 |
| Component (parts by weight) | | | | | | | | |
| Base grease | | | | | | | | |
| Base oil | | | | | | | | |
| Alkyldiphenyl ether oil[1] | 32 | 32 | 32 | 80 | 32 | 32 | 32 | 32 |
| Synthetic hydrocarbon oil[2] | 48 | 48 | 48 | — | 48 | 48 | 48 | 48 |
| Polyol ester oil[3] | — | — | — | — | — | — | — | — |
| Polymer ester oil[4] | — | — | — | — | — | — | — | — |
| Mineral oil[5] | — | — | — | — | — | — | — | — |
| Thickener | | | | | | | | |
| Amine: p-toluidine | 4.4 | 4.4 | 4.4 | 9.2 | 4.4 | 4.4 | 4.4 | 4.4 |
| Amine: cyclohexyl amine | — | — | — | — | — | — | — | — |
| Amine: octyl amine | 5.3 | 5.3 | 5.3 | — | 5.3 | 5.3 | 5.3 | 5.3 |
| Diisocyanate: MDI[6] | 10.3 | 10.3 | 10.3 | 10.8 | 10.3 | 10.3 | 10.3 | 10.3 |
| Li-12-hydroxystearate | — | — | — | — | — | — | — | — |
| (Base oil + Thickener) | (100) | (100) | (100) | (100) | (100) | (100) | (100) | (100) |
| Additive | | | | | | | | |
| Antioxidant A[7] | — | — | — | — | — | — | — | — |
| Antioxidant B[8] | 1 | 1 | 1 | 1 | 1 | 1 | — | 1 |
| Magnesium powder[9] | 1 | — | — | 0.1 | — | — | — | 15 |
| Magnesium stearate[10] | — | 1 | 5 | — | — | 0.02 | — | — |
| Properties | | | | | | | | |
| Worked penetration | — | — | — | — | — | — | — | — |
| High-temperature and high-speed test (180° C.), h | — | — | — | — | — | — | — | — |
| High-temperature and high-speed test (150° C.), h | — | — | — | — | — | — | — | — |
| Lifetime limited by the occurrence of peeling, h | >300 | >300 | >300 | >300 | 54 | 65 | 43 | 87 |

Manufacturing companies, Names of products (kinematic viscosity at 40° C.)
[1] Matsumura Oil Research Corp., Moresco Hilube LB100(97 mm²/s)
[2] Nippon Steel Chemical Co., Ltd., Shin-fluid 801 (47 mm²/s)
[6] Nippon Polyurethane Industry Co., Ltd., Millionate MT
[8] Sumitomo Chemical Co., Ltd., Hindered phenol
[9)10] Wako Pure Chemical Industries, Ltd., Reagent As shown in table 2-1, because the grease compositions of the examples 2-1 through 2-4 were capable of effectively preventing the generation of the peculiar peeling on the rolling surfaces of the rolling bearings with the rolling surfaces thereof turning into white in its texture, the grease compositions showed favorable results in the sudden acceleration/deceleration test 5. In the sudden acceleration/deceleration test 5, the grease compositions of the examples 2-1 through 2-4 all showed not less than 300 hours.

In table 2-2, as the synthetic hydrocarbon oil, the alkyldiphenyl ether oil, and polyol ester oil all used as the base oil, Shin-fluid 801 (commercial name), produced by Nippon Steel Chemical Co., Ltd., which has a kinematic viscosity of 47 mm²/second at 40° C., Moresco Hilube LB100 (commercial name), produced by Matsumura Oil Research Corp., which has a kinematic viscosity of 97 mm²/second at 40° C., and the Kaolube 268 produced by Kao Corporation were used respectively. As mineral oil, paraffin oil having a kinematic viscosity of 30.7 mm²/second (40° C.) was used.

As the antioxidant, alkylated diphenylamine was used.

The worked penetration of each of the obtained grease compositions was measured in accordance with JIS K 2220. The high-temperature and high-speed test 4 and a sudden acceleration/deceleration test 6 were conducted on them. The test method and the test condition of the high-temperature and high-speed test 4 and the sudden acceleration/deceleration test 6 are shown below. The results are shown in table 2-2.

<High-Temperature and High-Speed Test 4>

1.8 g of each of grease compositions shown in table 2-2 was enclosed in each rolling bearing (6204) for use in a robot. Each rolling bearing was rotated at 10000 rpm by setting the temperature of the outer-diameter portion of the outer ring thereof to 180° C. and applying radial and axial loads of 67 N thereto. A period of time till each rolling bearing was seized was measured.

<Sudden Acceleration/Deceleration Test 6>

2.3 g of each of grease compositions shown in table 2-2 was enclosed in a rolling bearing (6303) for use in a robot. To apply a load to the rolling bearing, a sudden acceleration/deceleration test 6 was conducted on a rolling bearing, having an inner ring which rotates, was mounted thereon. The condition of the sudden acceleration/deceleration test 6 was that as the drive condition, a load of 3234 N was applied to a pulley mounted on the tip of the rotational shaft of the alternator, and the rotational speed was set to 0 to 18000 rpm. The time when the generator stopped because peculiar peeling occurred inside the bearing and vibration of the vibration detector exceeded the predetermined value was measured. In the test, 1 part by weight of pure water was mixed with 100 parts by weight of the grease composition. The test was conducted for 100 hours.

Examples 2-9 and 2-10

The Li-12-hydroxy stearate was supplied to the base oil shown in table 2-2. While the base oil was being stirred, the base oil was heated at 200° C. to dissolve the Li-12-hydroxy stearate therein. The mixing ratio of the Li-12-hydroxy stearate in each of the examples 2-9 and 2-10 is as shown in table 2-2. After the base oil was cooled, the magnesium-based additive and the antioxidant were added to the base oil at mixing ratios shown in table 2-2. Thereafter the base oil was homogenized by the three-roll mill to obtain a grease composition of each example. Similarly to the example 2-1, the high-temperature and high-speed test 4 and the sudden acceleration/deceleration test 6 were conducted on the obtained grease compositions. In consideration of the heat resistance of the lithium soap grease, the high-temperature and high-speed test 4 was conducted at 150° C. Results are shown in table 2-2.

Comparative Examples 2-5 Through 2-9

Similarly to the method of the example 2-1 and at a mixing ratio shown in table 2-2, base grease was prepared by selecting a thickener and a base oil and in addition, an additive was added to the base grease to obtain a grease composition of each comparative example. A test was conducted on each grease composition in a manner similar to that of the example 2-1 to evaluate the grease compositions. Results are shown in table 2-2.

TABLE 2-2

| | Example | | | | | | Comparative example | | | | |
|---|---|---|---|---|---|---|---|---|---|---|---|
| | 2-5 | 2-6 | 2-7 | 2-8 | 2-9 | 2-10 | 2-5 | 2-6 | 2-7 | 2-8 | 2-9 |
| Component (parts by weight) | | | | | | | | | | | |
| Base grease | | | | | | | | | | | |
| Base oil | | | | | | | | | | | |
| Alkyldiphenyl ether oil[1)] | 80 | 80 | — | — | — | — | 60 | — | — | — | — |
| Synthetic hydrocarbon oil[2)] | — | — | — | 87 | — | — | 20 | — | 87 | — | — |
| Polyol ester oil[3)] | — | — | 85 | — | 90 | — | — | 85 | — | — | 90 |
| Polymer ester oil[4)] | — | — | — | — | — | — | — | — | — | — | — |
| Mineral oil[5)] | — | — | — | — | — | 90 | — | — | — | 87 | — |
| Thickener | | | | | | | | | | | |
| Amine: p-toluidine | 9.3 | 9.3 | — | — | — | — | 9.3 | — | — | — | — |
| Amine: cyclohexyl amine | — | — | 6.6 | — | — | — | — | 6.6 | — | — | — |
| Amine: octyl amine | — | — | — | 6.6 | — | — | — | — | 6.6 | 6.6 | — |
| Diisocyanate: MDI[6)] | 10.7 | 10.7 | 8.4 | 6.4 | — | — | 10.7 | 8.4 | 6.4 | 6.4 | — |
| Li-12-hydroxystearate | — | — | — | — | 10 | 10 | — | — | — | — | 10 |
| (Base oil + Thickener) | (100) | (100) | (100) | (100) | (100) | (100) | (100) | (100) | (100) | (100) | (100) |
| Additive | | | | | | | | | | | |
| Antioxidant A[7)] | 2 | 2 | 2 | 2 | 2 | 2 | 2 | 2 | 2 | 2 | 2 |
| Antioxidant B[8)] | — | — | — | — | — | — | — | — | — | — | — |
| Magnesium powder[9)] | 0.1 | — | 1 | — | 1 | 1 | — | — | 20 | — | — |
| Magnesium stearate[10)] | — | 5 | — | 1 | — | — | — | 0.02 | — | — | — |
| Properties | | | | | | | | | | | |
| Worked penetration | 290 | 285 | 285 | 280 | 285 | 285 | 290 | 275 | 280 | 295 | 285 |
| High-temperature and high-speed test (180° C.), h | 690 | 740 | 490 | 430 | — | — | 420 | 210 | 570 | 180 | — |
| High-temperature and high-speed test (150° C.), h | — | — | — | — | 770 | 180 | — | — | — | — | 90 |

TABLE 2-2-continued

|  | Example | | | | | | Comparative example | | | | |
| --- | --- | --- | --- | --- | --- | --- | --- | --- | --- | --- | --- |
|  | 2-5 | 2-6 | 2-7 | 2-8 | 2-9 | 2-10 | 2-5 | 2-6 | 2-7 | 2-8 | 2-9 |
| Lifetime limited by the occurrence of peeling, h | >100 | >100 | >100 | >100 | >100 | >100 | 53 | 25 | 35 | 41 | 42 |

Manufacturing companies, Names of products (kinematic viscosity at 40° C.)
[1])Matsumura Oil Research Corp., Moresco Hilube LB100(97 mm$^2$/s)
[2])Nippon Steel Chemical Co., Ltd., Shin-fluid 801 (47 mm$^2$/s)
[3])Kao Corporation, KAOLUBE 268 (33 mm$^2$/s)
[5])Paraffinic mineral oil (30.7 mm$^2$/s)
[6])Nippon Polyurethane Industry Co., Ltd., Millionate MT
[7])Alkylated diphenylamine
[9)10)]Wako Pure Chemical Industries, Ltd., Reagent As shown in table 2-2, the rolling bearings of all of the examples 2-5 through 2-10 for use in a robot showed not less than 100 hours in the lifetime limited by the occurrence of peeling. Therefore the rolling bearings using the grease composition of the examples 2-5 through 2-10 respectively were capable of effectively preventing peculiar peeling from being generated on the rolling surfaces thereof with the rolling surfaces thereof turning into white in its texture.

Examples 2-11 Through 2-13 and 2-16

4,4'-diphenylmethane diisocyanate (Millionate MT produced by Nippon Polyurethane Industry Co., Ltd. Hereinafter referred to as MDI) was dissolved in one half of base oil shown in table 2-3 at a ratio shown in table 2-3. Monoamine was dissolved in the remaining half of the base oil at an equivalent weight two times larger than that of the MDI. The mixing ratio and the kind of each of the MDI and the monoamine is as shown in table 2-3.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil. The magnesium-based additive and the antioxidant were added to the base oil at a mixing ratio shown in table 2-3. The base oil was stirred at 100 to 120° C. for 10 minutes. Thereafter the base oil was cooled and homogenized by the three-roll mill to obtain a grease composition.

In table 2-3, as the synthetic hydrocarbon oil, the alkyldiphenyl ether oil, and the ester oils all used as the base oil, Shin-fluid 801 produced by Nippon Steel Chemical Co., Ltd., which has a kinematic viscosity of 47 mm$^2$/second at 40° C., the Moresco Hilube LB100 produced by Matsumura Oil Research Corp., which has a kinematic viscosity of 97 mm$^2$/second at 40° C., the Kaolube 268 produced by Kao Corporation, and Ketjenlube 115 produced by Akzo Nobel were used respectively. As the mineral oil, paraffin oil was used. As the antioxidant, alkylated diphenylamine or hindered phenol produced by Sumitomo Chemical Co., Ltd. was used.

A sudden acceleration/deceleration test 7 and the high-temperature and high-speed test 5 were conducted on the obtained grease compositions. The test method and the test condition are shown below. The results are shown in table 2-3.

<Sudden Acceleration/Deceleration Test 7>

2.3 g of each of grease compositions shown in table 2-3 was enclosed in a rolling bearing (6303). To apply a load to the rolling bearing, having an inner ring which rotates, the rolling bearing was mounted on the rotational shaft to support the rotating shaft. A sudden acceleration/deceleration test 7 was conducted. The condition of the sudden acceleration/deceleration test 4 was that as the drive condition, a load of 3234 N was applied to a pulley mounted on the tip of the rotational shaft of the alternator, and the rotational speed was set to 0 to 18000 rpm. The time when the generator stopped because peculiar peeling occurred inside the bearing and vibration of the vibration detector exceeded the predetermined value was measured as the lifetime limited by the occurrence of peeling.

The rolling bearings had not less than 300 hours in the lifetime limited by the occurrence of peeling and were evaluated as being excellent in the performance of preventing the generation of the peeling.

<High-Temperature and High-Speed Test 5>

1.8 g of each of grease compositions shown in table 2-3 was enclosed in each rolling bearing (6204). Each rolling bearing was rotated at 10000 rpm by setting the temperature of the outer-diameter portion of the outer ring thereof to 180° C. and applying radial and axial loads of 67 N thereto. A period of time till each rolling bearing was seized was measured.

Examples 2-14 and 2-15

The Li-12-hydroxy stearate was supplied to the base oil shown in table 2-3. While the base oil was being stirred, the base oil was heated at 200° C. to dissolve the Li-12-hydroxy stearate therein. The mixing ratio of the Li-12-hydroxy stearate in each of the examples 2-14 and 2-15 is as shown in table 2-3. After the base oil was cooled, the inorganic magnesium, the organic magnesium, and the antioxidant were added to the base oil at mixing ratios shown in table 2-3. Thereafter the base oil was homogenized by the three-roll mill to obtain a grease composition of each example. Similarly to the example 2-11, the high-temperature and high-speed test 5 and a sudden acceleration/deceleration test 7 were conducted on the obtained grease compositions. In consideration of the heat resistance of the lithium soap grease, the high-temperature and high-speed test 5 was conducted at 150° C. The results are shown in table 2-3.

Comparative Examples 2-10 Through 2-15

Similarly to the method of the example 2-11 and at a mixing ratio shown in table 2-3, base grease was prepared by selecting a thickener and a base oil and in addition, an additive was added to the base grease to obtain a grease composition of each comparative example. A test was conducted on each grease composition in a manner similar to that of the example 2-11 to evaluate the grease compositions. Results are shown in table 2-3.

TABLE 2-3

|  | Example | | | | | | Comparative example | | | | | |
|---|---|---|---|---|---|---|---|---|---|---|---|---|
|  | 2-11 | 2-12 | 2-13 | 2-14 | 2-15 | 2-16 | 2-10 | 2-11 | 2-12 | 2-13 | 2-14 | 2-15 |
| Component (parts by weight) Base grease Base oil | | | | | | | | | | | | |
| Alkyldiphenyl ether oil[1] | — | — | — | — | — | 48 | — | — | — | — | 48 | 48 |
| Synthetic hydrocarbon oil[2] | — | 60 | 60 | — | — | 32 | — | 61.4 | 60 | — | 32 | 32 |
| Polyol ester oil[3] | 85 | — | 25 | 90 | — | — | — | — | 25 | — | — | — |
| Polymer ester oil[4] | — | 25 | — | — | — | — | — | 25.6 | — | — | — | — |
| Mineral oil[5] | — | — | — | — | 90 | — | 90 | — | — | 87 | — | — |
| Thickener | | | | | | | | | | | | |
| Amine: p-toluidine | — | — | — | — | — | 4.4 | — | — | — | — | 4.4 | 4.4 |
| Amine: cyclohexyl amine | 6.6 | 6.6 | 6.6 | — | — | — | — | — | 6.6 | — | — | — |
| Amine: octyl amine | — | — | — | — | — | 5.3 | — | 6.6 | — | 6.6 | 5.3 | 5.3 |
| Diisocyanate: MDI[6] | 8.4 | 8.4 | 8.4 | — | — | 10.3 | — | 6.4 | 8.4 | 6.4 | 10.3 | 10.3 |
| Li-12-hydroxystearate | — | — | — | 10 | 10 | — | 10 | — | — | — | — | — |
| (Base oil + Thickener) | (100) | (100) | (100) | (100) | (100) | (100) | (100) | (100) | (100) | (100) | (100) | (100) |
| Additive | | | | | | | | | | | | |
| Antioxidant A[7] | 2 | 2 | 2 | 2 | 2 | — | 2 | 2 | 2 | 2 | — | — |
| Antioxidant B[8] | — | — | — | — | — | 1 | — | — | — | — | — | 1 |
| Magnesium powder[9] | 0.1 | — | — | 1 | — | 1 | — | — | — | — | — | — |
| Magnesium stearate[10] | — | 1 | 5 | — | 10 | — | — | — | — | — | — | 0.02 |
| Properties | | | | | | | | | | | | |
| Worked penetration | — | — | — | — | — | — | — | — | — | — | — | — |
| High-temperature and high-speed test (180° C.), h | 410 | 490 | 440 | — | — | 570 | — | 410 | 330 | 180 | 290 | 420 |
| High-temperature and high-speed test (150° C.), h | — | — | — | 990 | 340 | — | 70 | — | — | — | — | — |
| Lifetime limited by the occurrence of peeling, h | >300 | >300 | >300 | >300 | >300 | >300 | 31 | 24 | 35 | 55 | 43 | 65 |

Manufacturing companies, Names of products (kinematic viscosity at 40° C.)
[1] Matsumura Oil Research Corp., Moresco Hilube LB100(97 mm²/s)
[2] Nippon Steel Chemical Co., Ltd., Shin-fluid 801 (47 mm²/s)
[3] Kao Corporation, KAOLUBE 268 (33 mm²/s)
[4] Akzo Nobel, KETJENLUBE 115 (112 mm²/s)
[5] Paraffinic mineral oil (30.7 mm²/s)
[6] Nippon Polyurethane Industry Co., Ltd., Millionate MT
[7] Alkylated diphenylamine
[8] Sumitomo Chemical Co., Ltd., Hindered phenol
[9],[10] Wako Pure Chemical Industries, Ltd., Reagent As shown in table 2-3, the rolling bearings of the all of the examples 2-11 through 2-16 showed not less than 300 hours in the lifetime limited by the occurrence of peeling. Therefore the rolling bearings using the grease composition of the examples 2-11 through 2-16 respectively were capable of effectively preventing the generation of the peculiar peeling on the rolling surfaces of the rolling bearings with the rolling surfaces thereof turning into white in its texture.

Examples 3-1 Through 3-3, Comparative Examples 3-1 Through 3-3

A life test was conducted by lubricating needle-like roller bearings (outer diameter φ of inner ring: 24 mm, inner diameter φ of outer ring: 32 mm, width: 20 mm, rollers φ 4×16.8 mm×14 pieces) with a lubricating oil composition shown in table 3.

In the life test, the bearing was rotated at a radial load of 6.76 kN, a quick acceleration and deceleration repeated in the order of 3000 rpm→500 rpm→3000 rpm→500 rpm, and a bearing temperature of 100° C. The time (peeling-generated time) when peeling was generated on the rolling surface was measured. When the vibration of the vibration detector exceeded the predetermined value, a tester was stopped. The time when the tester was stopped was set as the peeling-generated time. Thereafter the generation of the peeling on the rolling surface was visually checked. Results are shown in table 3.

TABLE 3

|  | Example | | | Comparative example | | |
|---|---|---|---|---|---|---|
|  | 3-1 | 3-2 | 3-3 | 3-1 | 3-2 | 3-3 |
| Lubricating oil composition component (% by weight) Base oil | | | | | | |
| Water-glycol hydraulic oil[1] | 99.5 | 97 | — | 100 | — | 85 |
| Mineral oil[2] | — | — | 89.5 | — | 90 | — |
| Water | — | — | 10 | — | 10 | — |
| Additive | | | | | | |
| Magnesium powder[3] | 0.5 | — | 0.5 | — | — | 15 |
| Magnesium stearate[4] | — | 3 | — | — | — | — |
| Lifetime limited by the occurrence of peeling, h | 149 | 243 | >300 | 13 | 84 | 49[5] |

[1] Water:glycol = 40:60, kinematic viscosity of 32 mm2/sec at 40° C.
[2] Mineral oil is paraffinic oil having kinematic viscosity of 30.7 mm2/sec at 40° C.
[3],[4] Wako Pure chemical Industries, Ltd., Reagent
[5] Not hydrogen brittleness-caused peculiar peeling but peeling occuring from the surface After the life test, the color of the rolling surface of the bearing of the examples 3-1 through 3-3 changed but the color of the rolling surface of the bearing of the comparative examples 3-1 through 3-3 did not change. Considering that the color change of the rolling surface restrained the hydrogen brittleness-caused peculiar peeling, the composition of the color-changed portion (generated film) was analyzed. As a result of the analysis of the composition of the film generated on the top surface by means of XPS (ESCA), magnesium was detected in addition to Fe, O, and C. A close examination of the detected magnesium revealed that the generated film consisted of a magnesium-based composite film.

As apparent from the result of the analysis, it has been found that the magnesium-based additive had decomposition and reaction on the frictional wear surface of the bearing or on the newly generated metal surface which was exposed owing to wear to form the film containing the magnesium compound in addition to the iron oxide on the rolling surface of the bearing. The film formed in this manner prevented hydrogen generated owing to the decomposition of the lubricant composition from penetrating into the bearing steel, thus restraining the occurrence of the hydrogen brittleness-caused peeling. Consequently it has been confirmed that the life characteristic of the bearing of each of the examples evaluated in terms of the peeling generation time could be improved.

Examples 4-1 Through 4-8

In a reaction container, after a thickener was added to a base oil, uniformalizing treatment was carried out by using a three-roll mill to obtain lithium soap/mineral oil-based grease (viscosity of base oil at 40° C.: 100 $mm^2$/second, worked penetration: 220), urea/PAO oil-based grease (viscosity of base oil at 40° C.: 46 $mm^2$/second, worked penetration: 280), lithium soap/ester oil-based grease (viscosity of base oil at 40° C.: 33 $mm^2$/second, worked penetration: 250), and urea/ether oil-based grease (viscosity of base oil at 40° C.: 100 $mm^2$/second, worked penetration: 300) shown in table 4-1.

Bismuth powder was added to the grease at ratios shown in table 4-1 to prepare the grease of examples 4-1 through 4-8. An extreme-pressure property evaluation test 1 and a roller bearing test were conducted on the obtained grease. Results are shown in table 4-1.

Comparative Examples 4-1 Through 4-10

In a reaction container, after a thickener was added to a base oil, uniformalizing treatment was carried out by using a three-roll mill to obtain the lithium soap/mineral oil-based grease (viscosity of base oil at 40° C.: 100 $mm^2$/second, worked penetration: 220), the urea/PAO oil-based grease (viscosity of base oil at 40° C.: 46 $mm^2$/second, worked penetration: 280), the lithium soap/ester oil-based grease (viscosity of base oil at 40° C.: 30 $mm^2$/second, worked penetration: 250), and the urea/ether oil-based grease (viscosity of base oil at 40° C.: 100 $mm^2$/second, worked penetration: 300) shown in table 4-2.

Bismuth powder, molybdenum dithiocarbamate, or zinc powder was added to the grease at ratios shown in table 4-2 to prepare the grease of comparative examples 4-1 through 4-10. Similarly to a manner done on the examples 4-1, the extreme-pressure property evaluation test 1 and the roller bearing test were conducted on the obtained grease. Results are shown in table 4-2.

TABLE 4-1

| Grease composition | Example | | | | | | | |
|---|---|---|---|---|---|---|---|---|
| | 4-1 | 4-2 | 4-3 | 4-4 | 4-5 | 4-6 | 4-7 | 4-8 |
| Grease (parts by weight) | | | | | | | | |
| Lithium soap/mineral oil-based grease | 95 | 95 | — | — | — | — | — | — |
| Urea/PAO oil-based grease | — | — | 95 | 95 | — | — | 99 | 88 |
| Lithium soap/ester oil-based grease | — | — | — | — | 95 | — | — | — |
| Urea/ether oil-based grease | — | — | — | — | — | 95 | — | — |
| Extreme-pressure agent (parts by weight) | | | | | | | | |
| Bismuth powder A[1] | 5 | — | 5 | — | 5 | 5 | 1 | 12 |
| Bismuth powder B[2] | — | 5 | — | 5 | — | — | — | — |
| Bismuth powder C[3] | — | — | — | — | — | — | — | — |
| Molybdenum dithiocarbamate[4] | — | — | — | — | — | — | — | — |
| Zinc powder | — | — | — | — | — | — | — | — |
| Extreme-pressure property evaluation test, h | 300 | >300 | >500 | >500 | 130 | 150 | 320 | >500 |
| Roller bearing test, ° C. | 55 | 58 | 56 | 68 | 51 | 64 | 60 | 65 |

[1] Kojundo Chemical Laboratory Co., Ltd., BIEO2PB, particle diameter: 75-150 μm
[2] Kojundo Chemical Laboratory Co., Ltd., BIEO9PB, particle diameter: 10-38 μm
[3] Particle diameter: >200 μm
[4] Vanderbilt Co., Ltd., Molyvan A

TABLE 4-2

| Grease composition | Comparative example | | | | | | | | | |
|---|---|---|---|---|---|---|---|---|---|---|
| | 4-1 | 4-2 | 4-3 | 4-4 | 4-5 | 4-6 | 4-7 | 4-8 | 4-9 | 4-10 |
| Grease (parts by weight) | | | | | | | | | | |
| Lithium soap/mineral oil-based grease | 100 | — | — | — | 95 | 95 | 95 | — | — | — |
| Urea/PAO oil-based grease | — | 100 | — | — | — | — | — | 95 | 99.99 | 80 |
| Lithium soap/ester oil-based grease | — | — | 100 | — | — | — | — | — | — | — |
| Urea/ether oil-based grease | — | — | — | 100 | — | — | — | — | — | — |

TABLE 4-2-continued

| Grease composition | Comparative example | | | | | | | | | |
|---|---|---|---|---|---|---|---|---|---|---|
| | 4-1 | 4-2 | 4-3 | 4-4 | 4-5 | 4-6 | 4-7 | 4-8 | 4-9 | 4-10 |
| Extreme-pressure agent (parts by weight) | | | | | | | | | | |
| Bismuth powder A[1] | — | — | — | — | — | — | — | — | 0.01 | 20 |
| Bismuth powder B[2] | — | — | — | — | — | — | — | — | — | — |
| Bismuth powder C[3] | — | — | — | — | — | — | 5 | 5 | — | — |
| Molybdenum dithiocarbamate[4] | — | — | — | — | 5 | — | — | — | — | — |
| Zinc powder | — | — | — | — | — | 5 | — | — | — | — |
| Extreme-pressure property evaluation test, h | 16 | 39 | 6 | 14 | 16 | 20 | 165 | 190 | 60 | 240 |
| Roller bearing test, ° C. | 85 | 74 | 48 | 72 | 90 | 84 | 80 | 78 | 72 | 96 |

[1]Kojundo Chemical Laboratory Co., Ltd., BIEO2PB, particle diameter: 75-150 μm
[2]Kojundo Chemical Laboratory Co., Ltd., BIEO9PB, particle diameter: 10-38 μm
[3]Particle diameter: >200 μm
[4]Vanderbilt Co., Ltd., Molyvan A <Extreme-Pressure Property Evaluation Test 1>.

An apparatus for evaluating extreme-pressure property is shown in FIG. 11. The evaluation test apparatus is constructed of a ring-shaped specimen 502 of φ40×10 fixed to a rotational shaft 501 and a ring-shaped specimen 503 whose end surface is rubbed with an end surface 504 of the specimen 502. The grease for the roller bearing was applied to the end surface 504, and the rotational shaft 501 was rotated at 2000 rpm. An axial load of 490N in the right-hand direction A in FIG. 11 and a radial load of 392N were applied to evaluate the extreme-pressure property thereof. The extreme-pressure property was evaluated by measuring vibrations of the rotational shaft 501 generated owing to an increase of the frictional wear of sliding portions of both specimens 502, 503 by a vibration sensor. The test was conducted until the vibration value of the rotational shaft 41 became twice as large as an initial value thereof. The period of time it took for the vibration value thereof to become twice as large as the initial value thereof was measured.

The longer is the period of time it took for the vibration value thereof to become twice as large as the initial value thereof, the larger was the extreme-pressure property effect, and hence excellent resistance to heat and durability are shown. The resistance to heat and durability of the grease of each of the examples 4-1 through 4-8 and the comparative examples 4-1 through 4-10 was evaluated by comparing the above-described measured time periods with one another.
<Roller Bearing Test>

3.6 g of each of the grease was enclosed in tapered roller bearings 30206, and each of the tapered roller bearing was operated at an axial load of 980N, the number of rotations of 2600 rpm, and a room temperature to measure the temperature of the surface of the flange portion during the rotation thereof. An average value of the temperature of the surface of the flange portion was computed in four to eight hours after the operation of the tapered roller bearing started.

As sliding friction generated between the flange portion and the "roller" becomes larger, the temperature of the surface of the flange portion during the rotation thereof becomes increasingly high. Therefore the resistance to heat and durability of the grease of each of the examples and the comparative examples was evaluated by comparing above-described measured temperatures with one another. That the above-described measured temperature is not more than 70° C. was set as the standard by which the grease is determined to have resistance to heat and durability.

Comparing the grease of the examples 4-1 Through 4-8 and the comparative examples 4-1 through 4-10 shown in tables 4-1 and 4-2 with one another, in terms of the kind of the extreme-pressure agent, the bismuth powder showed excellent resistance to heat and durability in the extreme-pressure property evaluation test 1 and the roller bearing test.

Examples 5-1 Through 5-5

In a reaction container, a thickener was added to base oil, and uniformalizing treatment was performed by using a three-roll mill to obtain the urea/PAO oil-based grease (viscosity of base oil at 40° C.: 46 mm²/second) as shown in table 5. Inorganic bismuth and amine-based antioxidant (Noclack AD-F produced by Ouchi Shinko Chemical Industrial Co., Ltd.) were added to the above-described grease as an extreme-pressure agent and an additive respectively at ratios shown in table 5 to prepare the grease of examples 5-1 through 5-5. An extreme-pressure property evaluation test 2 and a high-temperature and high-speed test 6 were conducted on the obtained grease. Results are shown in table 5.

Comparative Examples 5-1 Through 5-7

In a reaction container, a thickener was added to base oil, and uniformalizing treatment was performed by using a three-roll mill to obtain the lithium soap/mineral oil-based grease (viscosity of base oil at 40° C.: 100 mm²/second) and the urea/PAO oil-based grease (viscosity of base oil at 40° C.: 46 mm²/second) as shown in table 5. Inorganic bismuth serving as an extreme-pressure agent and amine-based antioxidant (Noclack AD-F produced by Ouchi Shinko Chemical Industrial Co., Ltd.) serving as an additive were added to the above-described grease at ratios shown in table 5 to prepare the grease of comparative examples 5-1 through 5-7. The extreme-pressure property evaluation test 2 and the high-temperature and high-speed test 6 were conducted on the obtained grease. Results are shown in table 5.
<Extreme-Pressure Property Evaluation Test 2>

An apparatus for evaluating extreme-pressure property is shown in FIG. 11. The evaluation test apparatus is constructed of a ring-shaped specimen 502 of φ40×10 fixed to a rotational shaft 501 and a ring-shaped specimen 503 whose end surface is rubbed with an end surface 504 of the specimen 502. The grease for the roller bearing was applied to the end surface 504, and the rotational shaft 501 was rotated at 2000 rpm. An axial load of 490N in the right-hand direction A in FIG. 11 and a radial load of 392N were applied to evaluate the extreme-pressure property thereof. The extreme-pressure property was evaluated by measuring vibrations of the rotational shaft

501 generated owing to an increase of the frictional wear of sliding portions of both specimens 502, 503 by a vibration sensor. The test was conducted until the vibration value of the rotational shaft 41 became twice as large as an initial value thereof. The period of time it took for the vibration value thereof to become twice as large as the initial value thereof was measured.

The longer is the period of time it took for the vibration value thereof to become twice as large as the initial value thereof, the larger was the extreme-pressure property effect, and hence excellent resistance to heat and durability are shown. The resistance to heat and durability of the grease of each of the examples 5-1 through 5-5 and the comparative examples 5-1 through 5-7 was evaluated by comparing the above-described measured time periods with one another.

<High-Temperature and High-Speed Test 6>

1.8 g of each of the grease compositions of the examples 5-1 through 5-5 and the comparative examples 5-1 through 5-7 was enclosed in a rolling bearing (dimension of bearing: inner diameter of φ20 mm×outer diameter of φ47 mm×width of 14 mm). Each rolling bearing was rotated at 10000 rpm by setting the temperature of the outer-diameter portion of the outer ring thereof to 150° C. and applying radial and axial loads of 67 N thereto. A period of time till each rolling bearing was seized was measured.

addition or non-addition, the kind, and the addition amount of the extreme-pressure agent, the urea/PAO-based oil grease was more resistant to heat and durable by not less than 10 times than the lithium soap/mineral oil-based grease.

Regarding the kind of the extreme-pressure agent, the examples 5-1 through 5-5 in which the inorganic bismuth was used was higher in the extreme-pressure property than the comparative examples 5-3 and 5-5 in which the organic bismuth was used and showed excellent resistance to heat and durability.

As shown in the examples 5-1 through 5-3, of the bismuth powder, the bismuth sulfate, and the bismuth trioxide, the bismuth powder showed the most favorable resistance to heat and durability.

INDUSTRIAL APPLICABILITY

The grease composition of the present invention is capable of effectively preventing the rolling surface from having hydrogen brittleness-caused peculiar peeling with the rolling surface turning into white in its texture. Therefore the grease composition can be preferably enclosed in the grease-enclosed bearing such as the rolling bearing for use in the electric auxiliary machine for a car such as the fan-coupling apparatus, the alternator, the idler pulley, the electromagnetic

TABLE 5

| Component (parts by weight) | Example | | | | | Comparative example | | | | | | |
|---|---|---|---|---|---|---|---|---|---|---|---|---|
| | 5-1 | 5-2 | 5-3 | 5-4 | 5-5 | 5-1 | 5-2 | 5-3 | 5-4 | 5-5 | 5-6 | 5-7 |
| Grease oil | | | | | | | | | | | | |
| Base oil | | | | | | | | | | | | |
| Mineral oil | — | — | — | — | — | 86 | — | 81 | 81 | — | — | — |
| PAO | 75 | 75 | 75 | 77 | 72 | — | 80 | — | — | 75 | 82 | 77 |
| Thickener | | | | | | | | | | | | |
| Octyl amine | — | — | — | 8.1 | — | — | — | — | — | — | 8.1 | — |
| Cyclohexyl amine | 8 | 8 | 8 | — | — | — | 8 | — | — | 8 | — | — |
| P-toluidine | — | — | — | — | 9.7 | — | — | — | — | — | — | 9.7 |
| Diphenylmethane diisocyanate | 10 | 10 | 10 | 7.9 | 11.3 | — | 10 | — | — | 10 | 7.9 | 11.3 |
| Lithium soap | — | — | — | — | — | 12 | — | 12 | 12 | — | — | — |
| Extreme-pressure agent | | | | | | | | | | | | |
| Bismuth sulfate | 5 | — | — | — | — | — | — | — | — | — | — | — |
| Bismuth trioxide | — | 5 | — | — | — | — | — | — | — | — | — | — |
| Bismuth powder | — | — | 5 | 5 | 5 | — | — | — | — | — | — | — |
| Organic bismuth compound [1] | — | — | — | — | — | — | — | 5 | — | 5 | — | — |
| MoDTC [2] | — | — | — | — | — | — | — | — | 5 | — | — | — |
| Amine-based antioxidant | 2 | 2 | 2 | 2 | 2 | 2 | 2 | 2 | 2 | 2 | 2 | 2 |
| Viscosity of base oil at 40° C. (mm²/s) | 46 | 46 | 46 | 46 | 46 | 100 | 46 | 100 | 100 | 46 | 46 | 46 |
| Evaluation | | | | | | | | | | | | |
| Extreme-pressure property evaluation test, h | 170 | 230 | 300 | 262 | 250 | 16 | 39 | 54 | 16 | 62 | 70 | 22 |
| High-temperature and high-speed test, h | 3580 | 3670 | 3880 | 4320 | 3360 | 270 | 3820 | 260 | 200 | 3680 | 3100 | 2800 |

[1] Bismuth subgallate

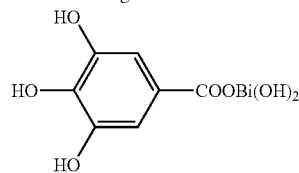

[2] Molyvan A (manufactured by Vanderbilt Co., Ltd.) Molybdenum dithiocarbamate

Comparing data of the urea/PAO oil-based grease and the lithium soap/mineral oil-based grease of the examples 5-1 through 5-5 and the comparative examples 5-1 through 5-7 shown in table 5 with one another, as a whole, irrespective of clutch for an air conditioner, an electromotive fan motor, and the like; the grease-enclosed bearing for motors for use in an industrial machine and electric equipment; the rolling bearing for use in the compressed fluid-feeding machine or the like for delivering various kinds of fluids inside a fuel cell battery under pressure; the rolling bearing for use in a robot which is used in operating portions of industrial robots; the rolling bearing for use in the wheel-supporting apparatus for rotatably supporting wheels on a suspension apparatus for a car; the rotation-transmitting apparatus with the built-in one-way clutch.

EXPLANATION OF REFERENCE SYMBOLS AND NUMERALS

Figure 1:
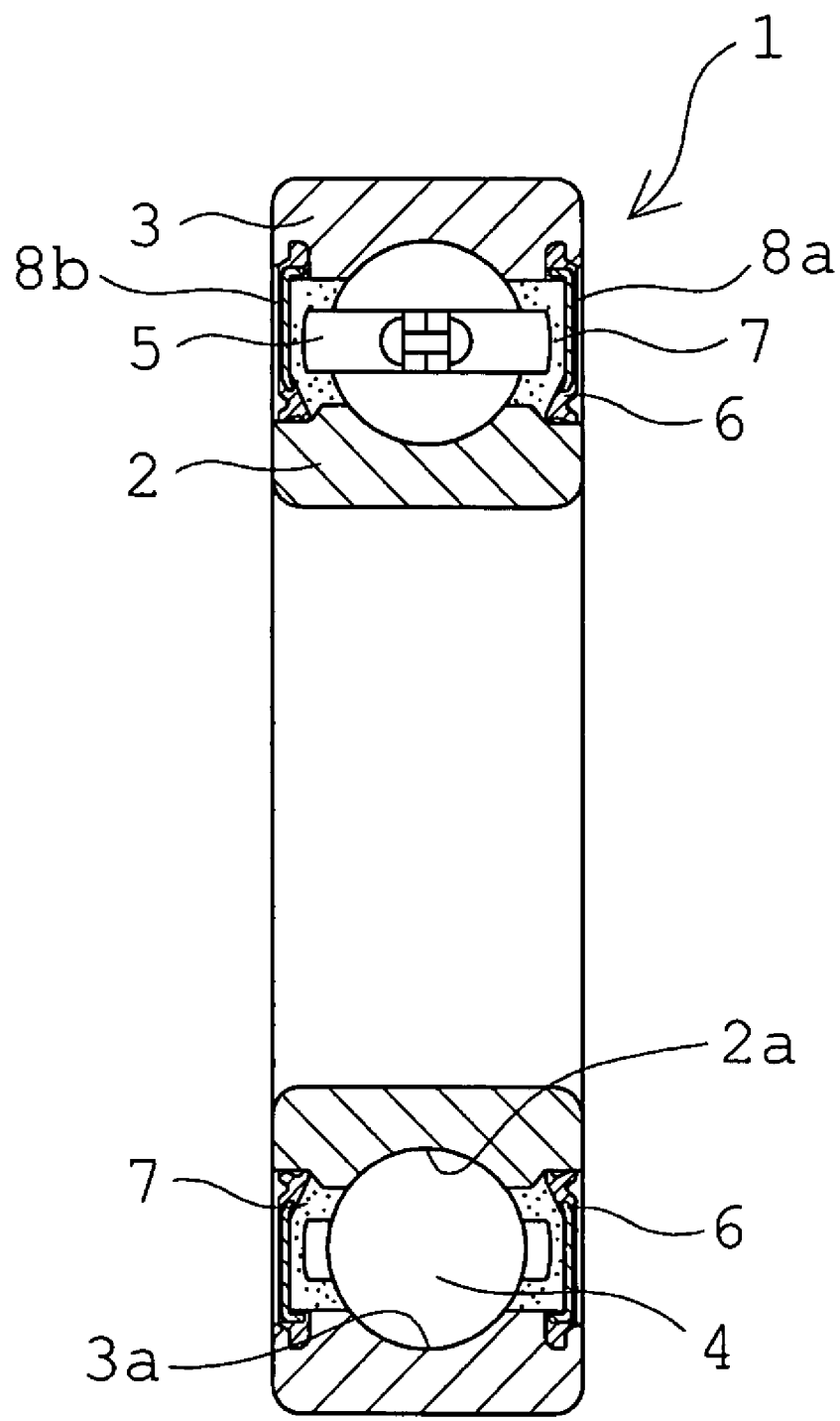
FIG. 1 is a sectional view of a grease-enclosed bearing (deep groove ball bearing).
Figure 2:
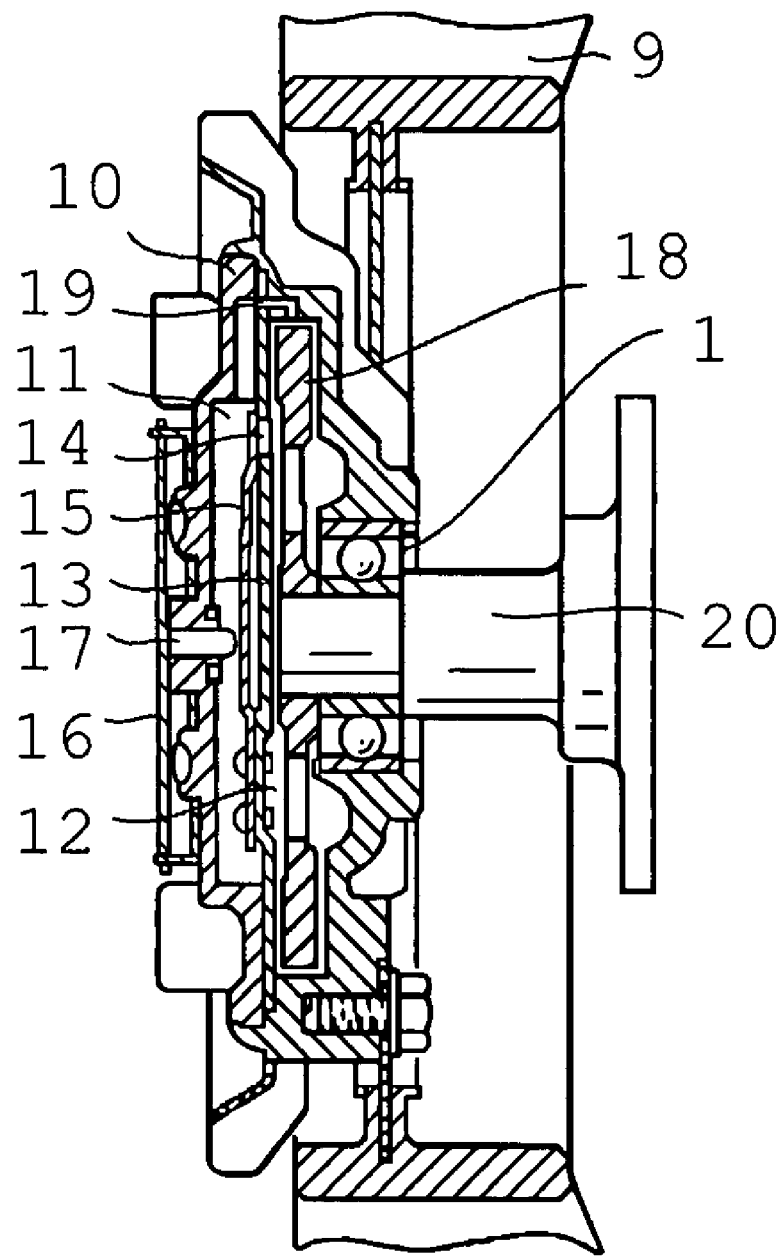
FIG. 2 is a sectional view of a fan coupling apparatus.
Figure 3:
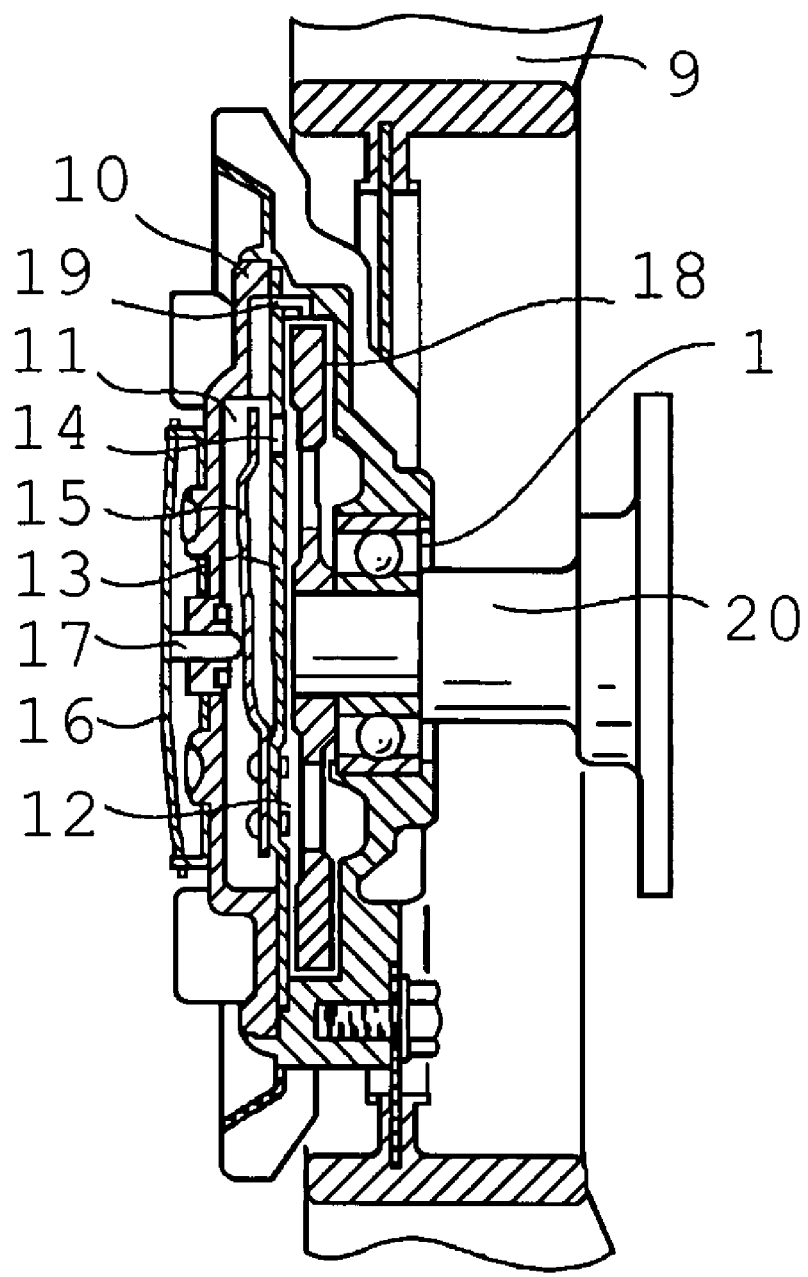
FIG. 3 is a sectional view of a fan coupling apparatus.
Figure 4:
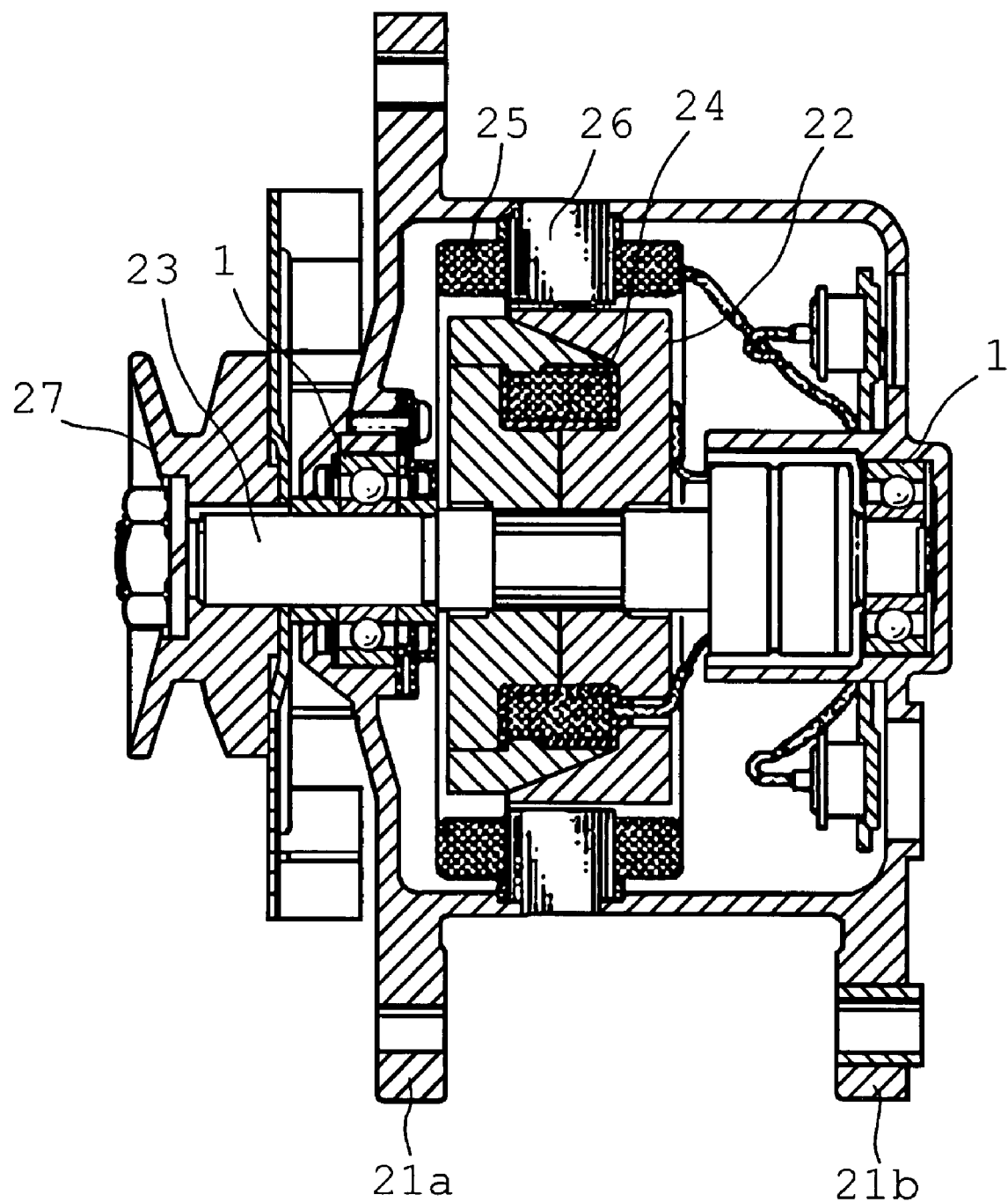
FIG. 4 is a sectional view of an alternator.
Figure 5:
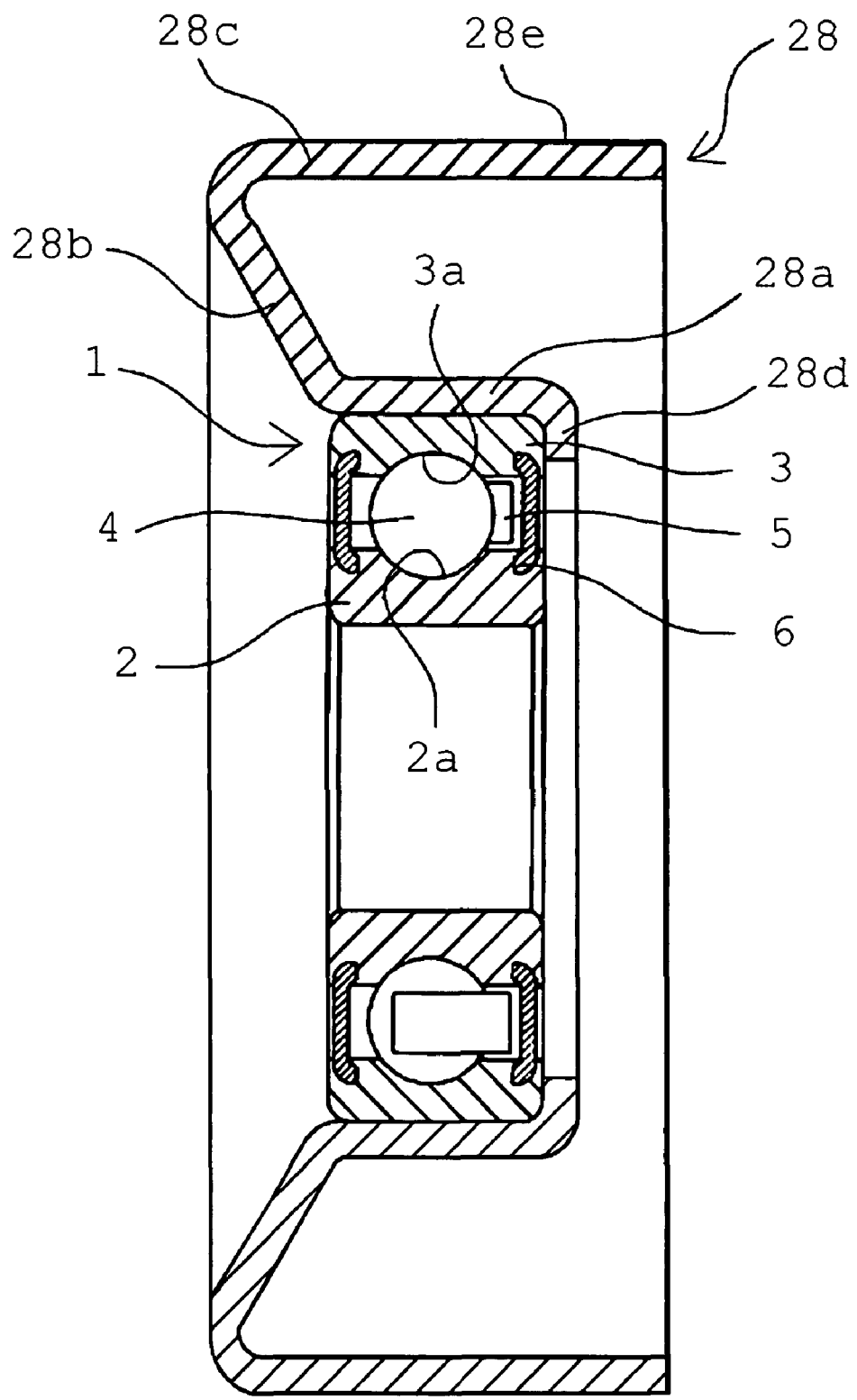
FIG. 5 is a sectional view of an idler pulley.
Figure 6:
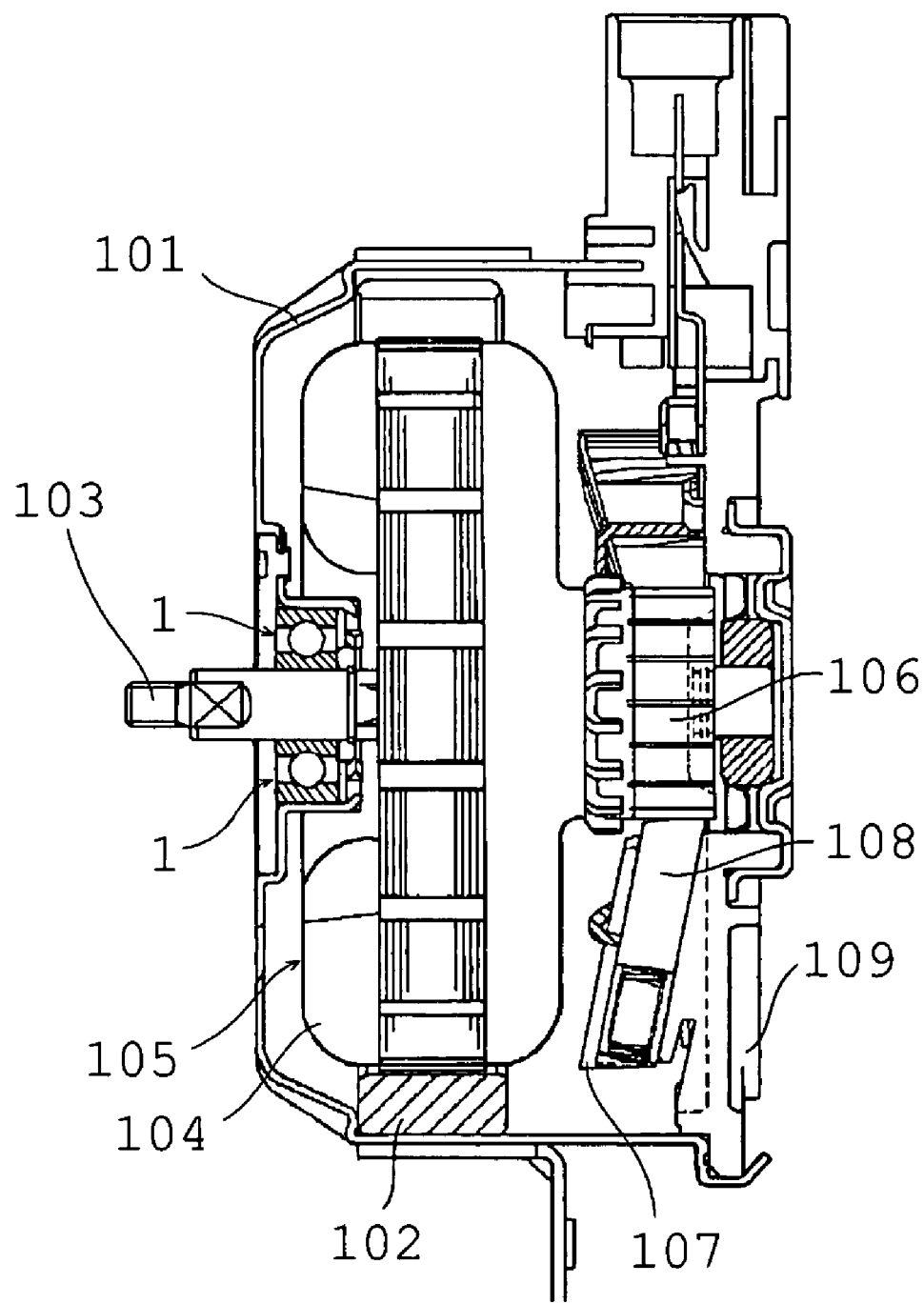
FIG. 6 is a sectional view of a construction of a motor.
Figure 7:
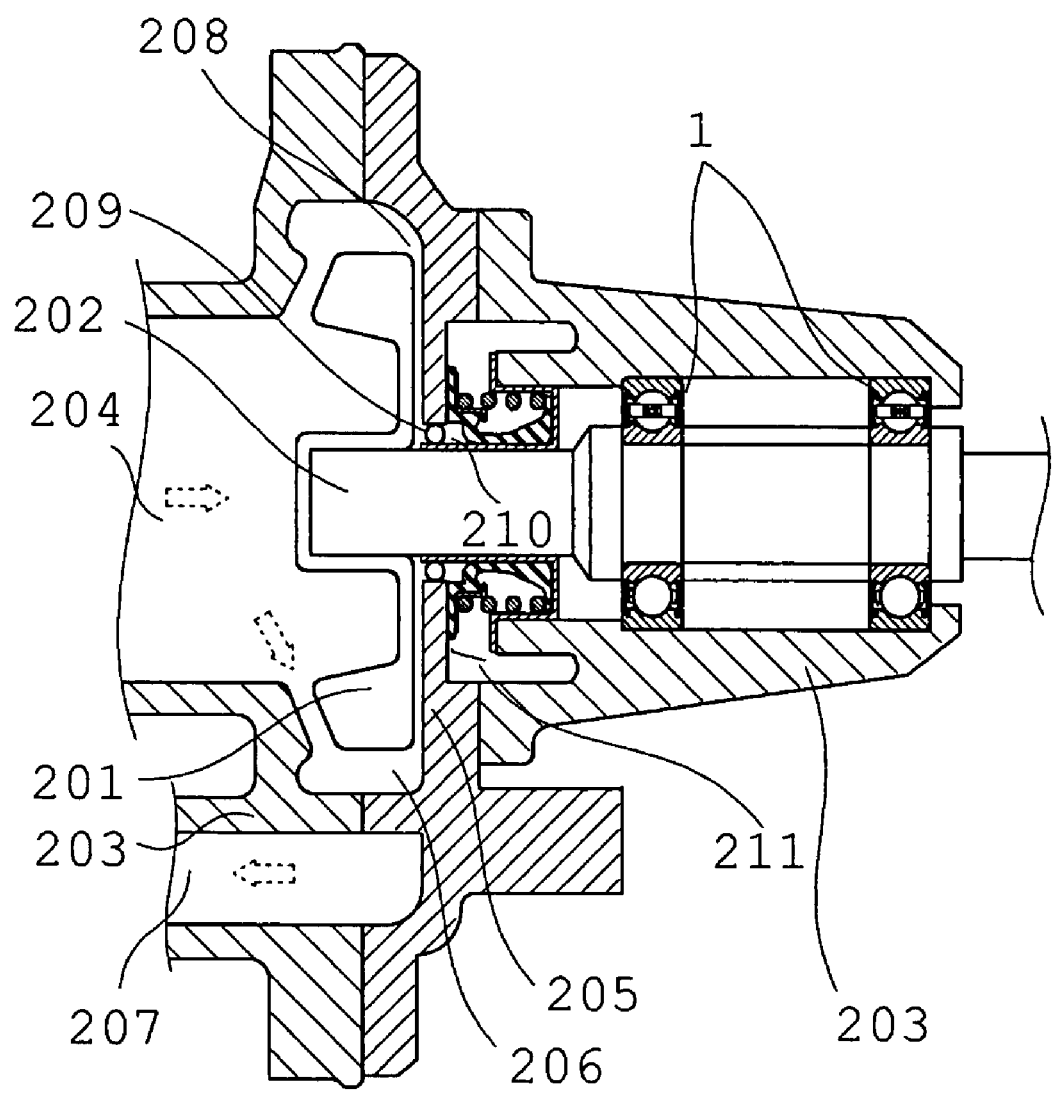
FIG. 7 is a sectional view of an impeller-type compressed fluid-feeding machine.
Figure 8:
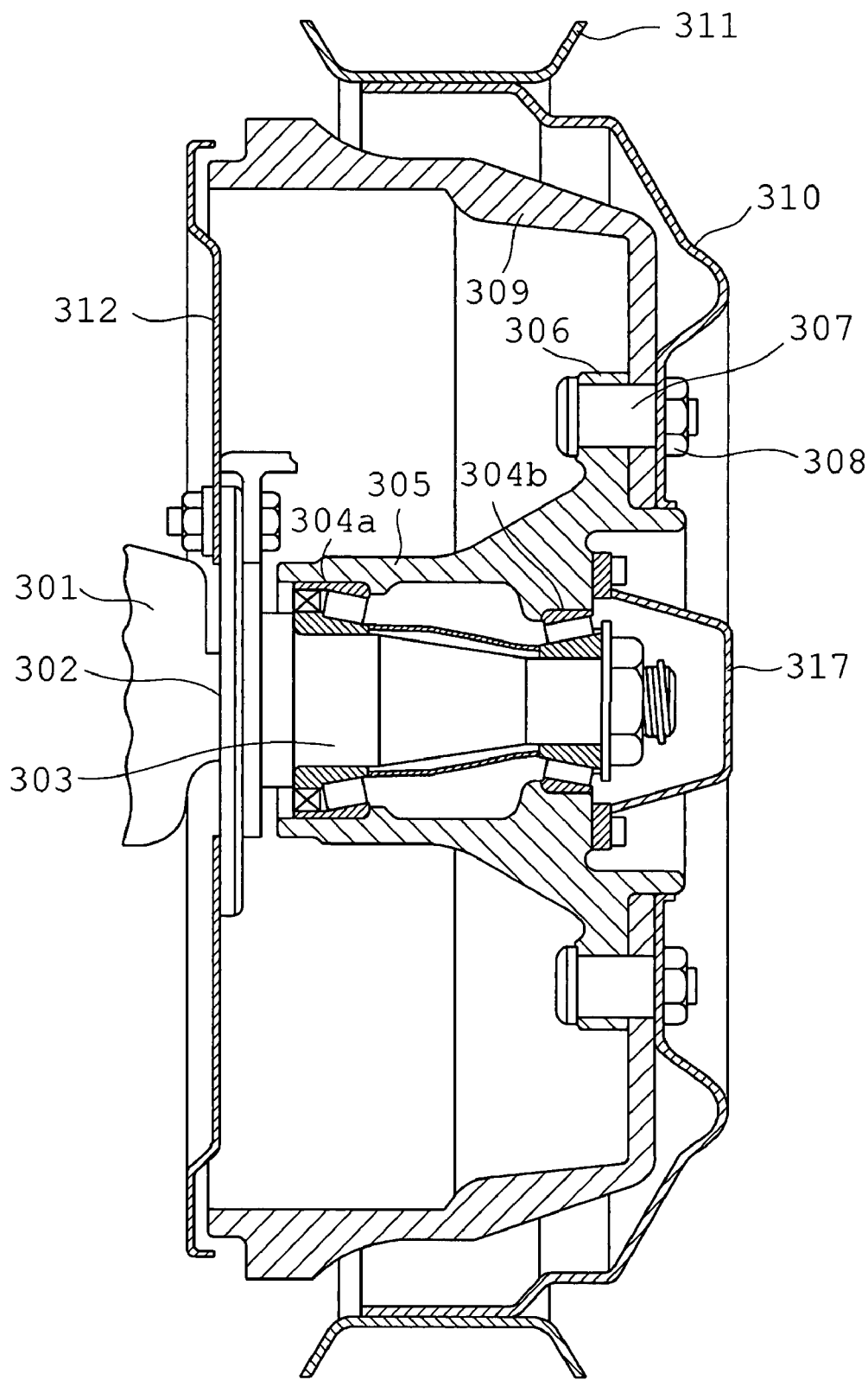
FIG. 8 is a sectional view of a wheel-supporting apparatus.
Figure 9:
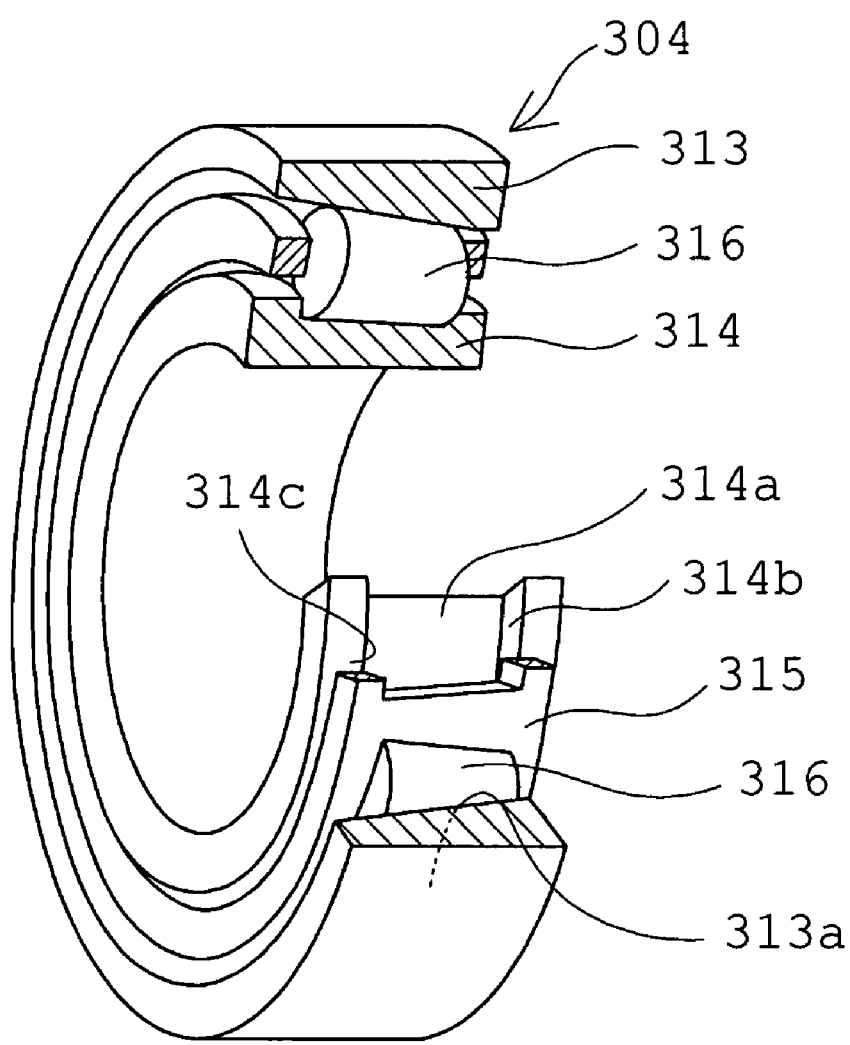
FIG. 9 is a partly cut-away perspective view of a tapered roller bearing.
Figure 10:
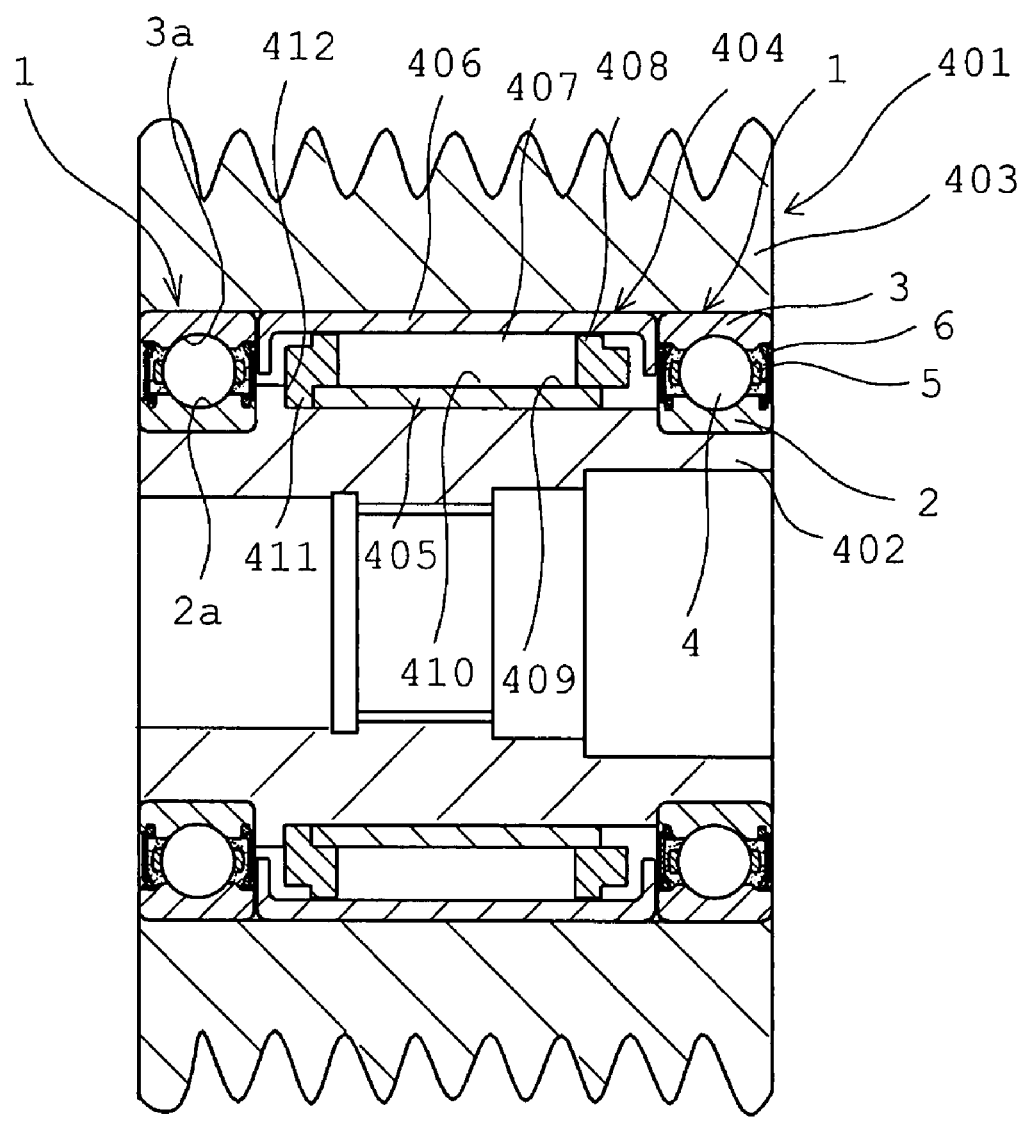
FIG. 10 is a sectional view showing a rotation-transmitting apparatus with a built-in one-way clutch.
Figure 11:
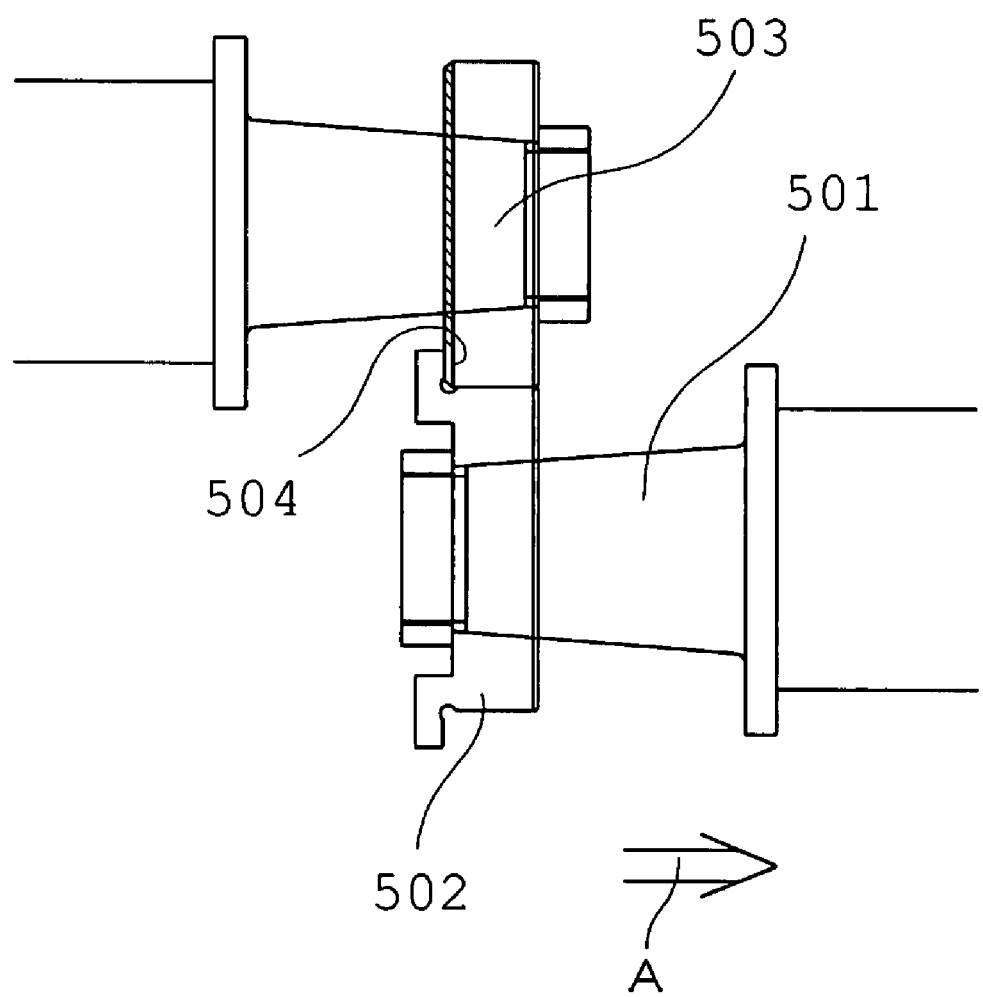
FIG. 11 shows an extreme-pressure property evaluation test apparatus.
Figure 12:
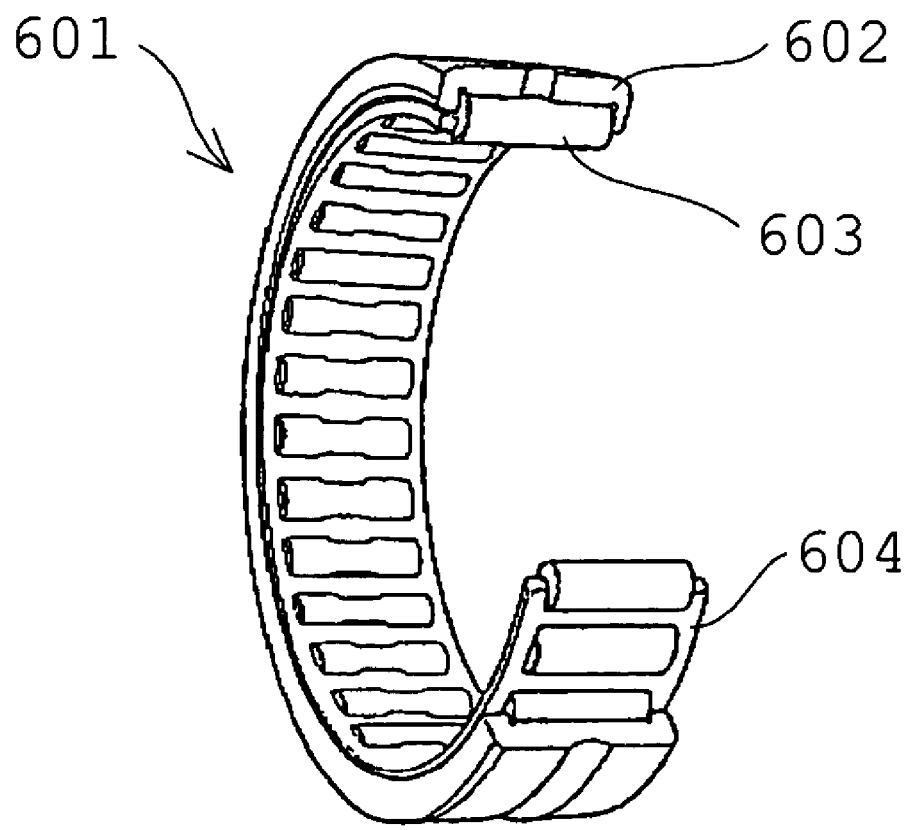
FIG. 12 is a perspective view of a needle-like roller bearing.

1: grease-enclosed bearing
2: inner ring
3: outer ring
4: rolling element
5: cage
6: sealing member
7: grease composition
8a: opening
8b: opening
9: cooling fan
10: case
11: oil chamber
12: stirring chamber
13: partitioning plate
14: port
15: spring
16: bimetal
17: piston
18: drive disk
19: circulation hole
20: drive shaft
21a: frame
21b: frame
22: rotor
23: rotational shaft of rotor
24: rotor coil
25: stator
26: stator coil
27: pulley
28: pulley body
101: jacket
102: stator
103: rotational shaft
104: winding
105: rotor
106: commutator
107: brush holder
108: brush
109: end frame
201: impeller
202: rotational shaft
203: casing
204: gas-sucking port
205: back plate
206: pressure volute
207: gas-discharging port
208: rear space
209: seal ring
210: gap
211: mechanical seal
301: steering knuckle
302: flange
303: axle
304: tapered roller bearing
305: axle hub
306: flange
307: stud bolt
308: nut
309: brake drum
310: wheel disk
311: rim
312: back plate
313: outer ring
314: inner ring
315: cage
316: tapered roller
317: grease cap
401: rotation-transmitting apparatus with built-in one-way clutch
402: sleeve
403: pulley
404: roller clutch
405: inner ring for clutch
406: outer ring for clutch
407: roller
408: cage for clutch
409: cam face
410: concavity
411: convexity
412: level-different surface
501: rotational shaft
502: ring-shaped specimen
503: ring-shaped specimen
504: end surface
601: needle-shaped roller bearing
602: outer ring
603: roller
604: cage

The invention claimed is:
1. A grease composition comprising a base grease consisting of a base oil and a thickener; and an additive added to said base grease, wherein said additive comprises a bismuth-based additive,
wherein a mixing ratio of said bismuth-based additive is set to 0.01 to 15 parts by weight for 100 parts by weight of said base grease,
wherein said bismuth-based additive consists of at least one additive selected from the group consisting of bismuth powder and sodium bismuthate,
wherein an average particle diameter of said bismuth powder is 10 to 200 μm, wherein said base oil consists of at least one oil selected from the group consisting of alkyldiphenylether oil, poly-α-olefin oil, mineral oil, ester oil, and ether oil, wherein said thickener is a diurea-based compound represented by a formula (1):

(1)

$R^1$ and $R^3$ in said formula (1) indicates hydrocarbon radicals having 6 to 20 carbon atoms; $R^1$ and $R^3$ may be identical to or different from each other; $R^2$ indicates an aromatic hydrocarbon radical having 6 to 15 carbon atoms.

2. The grease composition according to claim 1, which prevents a frictional wear surface of a sliding portion or a newly generated surface consisting of iron or the like exposed owing to wear from being peeled owing to hydrogen brittleness.

3. The grease composition according to claim 1, wherein said grease composition forms a film containing iron oxide and a bismuth compound on said frictional wear surface of said sliding portion or on said newly generated surface consisting of said iron or the like exposed owing to wear.

4. The grease composition according to claim 1, wherein a kinematic viscosity of said base oil at 40° C. is 30 to 200 mm²/s.

5. A grease-enclosed bearing in which a grease composition is enclosed; and said grease composition is said grease composition according to claim 1.

6. The grease-enclosed bearing according to claim 5, wherein said grease-enclosed bearing is a rolling bearing, for use in an electric auxiliary machine for a car, which rotatably supports a rotational shaft driven by an engine output on a stationary member, wherein said rolling bearing comprises an inner ring and an outer ring; a plurality of rolling elements disposed between said inner ring and said outer ring; and a sealing member, for sealing said grease composition according claim 1 on a periphery of said rolling elements, which is provided at openings disposed at both axial ends of said inner ring and said outer ring.

7. The grease-enclosed bearing according to claim 5, wherein said grease-enclosed bearing is a rolling bearing, for use in a fuel cell system, which rotatably supports a rotational portion of a compressed fluid-feeding machine for feeding a fluid used in said fuel cell system under pressure, wherein said rolling bearing comprises an inner ring and an outer ring; a plurality of rolling elements disposed between said inner ring and said outer ring; and a sealing member, for sealing said grease composition according to claim 1 on a periphery of said rolling elements, which is provided at openings disposed at both axial ends Of said inner ring and said outer ring.

8. The grease-enclosed bearing according to claim 5, wherein said grease-enclosed bearing is a bearing, for use in a motor, which supports a rotor of a motor, wherein said grease-enclosed rolling bearing comprises an inner ring and an outer ring; a plurality of rolling elements disposed between said inner ring and said outer ring; and a sealing member, for sealing said grease composition according to claim 1 on a periphery of said rolling elements, which is provided at openings disposed at both axial ends of said inner ring and said outer ring.

9. The grease-enclosed bearing according to claim 5, wherein said grease-enclosed bearing is a rolling bearing, for use in a robot, which rotatably supports a rotational portion of an industrial robot, wherein said rolling bearing comprises an inner ring and an outer ring; a plurality of rolling elements disposed between said inner ring and said outer ring; and a sealing member, for sealing said grease composition according to claim 1 on a periphery of said rolling elements, which is provided at openings disposed at both axial ends of said inner ring and said outer ring.

10. The grease-enclosed bearing according to claim 5, wherein said grease-enclosed bearing is a rolling bearing for use in a wheel-supporting apparatus, having a thrust sliding surface, which rotatably supports a rotational member rotating together with wheels through a grease-enclosed rolling bearing mounted on an outside surface of an axle.

11. A rotation-transmitting apparatus with a built-in one-way clutch comprising: an inside rotational member; a cylindrical outside rotational member disposed concentrically with said inside rotational member; a one-way clutch disposed between an outside surface of said inside rotational member and an inside surface of said outside rotational member and connecting said outside surface of said inside rotational member and said inside surface of said outside rotational member to each other only when said outside rotational member rotates at a higher speed than said inside rotational member; and a pair of rolling bearings disposed at both sides of said one-way clutch in an axial direction thereof and allowing said inside rotational member and said outside rotational member to rotate relative to each other with said rolling bearings receiving a radial load applied between said inside rotational member and said outside rotational member, wherein said grease composition according to claim 1 is enclosed inside a clutch inside space where a plurality of rollers composing said one-way clutch is mounted and inside a space where a plurality of rolling elements composing said rolling bearings is mounted.

12. The grease composition according to claim 1, wherein said bismuth-based additive consists of said bismuth powder.

13. A grease composition comprising a base grease composition comprising a base grease consisting of a base oil and a thickener and an additive added to said base grease, wherein said additive comprises a bismuth-based additive consisting of a sodium bismuthate, wherein a mixing ratio of said bismuth based additive is set to 0.01 to 15 parts by weight for 100 parts by weight of said base grease, wherein said base oil consists of at least one oil selected from the group consisting of alkyldiphenylether oil, poly-α-olefin oil, mineral oil, ester oil, and ether oil, wherein said thickener is a diurea-based compound represented by formula (1):

(1)

$R^1$ and $R^3$ in said formula (1) indicate hydrocarbon radicals having 6 to 20 carbon atoms; $R^1$ and $R^3$ may be identical to or different from each other; $R^2$ indicates an aromatic hydrocarbon radical having 6 to 15 carbon atoms.

* * * * *